(12) United States Patent
Johnsen et al.

(10) Patent No.: US 11,451,434 B2
(45) Date of Patent: Sep. 20, 2022

(54) SYSTEM AND METHOD FOR CORRELATING FABRIC-LEVEL GROUP MEMBERSHIP WITH SUBNET-LEVEL PARTITION MEMBERSHIP IN A HIGH-PERFORMANCE COMPUTING ENVIRONMENT

(71) Applicant: ORACLE INTERNATIONAL CORPORATION, Redwood Shores, CA (US)

(72) Inventors: Bjørn Dag Johnsen, Oslo (NO); Harald Høeg, Oslo (NO); Line Holen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 447 days.

(21) Appl. No.: 16/717,173

(22) Filed: Dec. 17, 2019

(65) Prior Publication Data

US 2020/0127890 A1 Apr. 23, 2020

Related U.S. Application Data

(63) Continuation of application No. 15/415,620, filed on Jan. 25, 2017, now Pat. No. 10,560,318.
(Continued)

(51) Int. Cl.
*H04L 41/08* (2022.01)
*H04L 49/356* (2022.01)
(Continued)

(52) U.S. Cl.
CPC .......... *H04L 41/08* (2013.01); *G06F 9/45558* (2013.01); *G06F 9/4856* (2013.01);
(Continued)

(58) Field of Classification Search
CPC . H04L 41/08; H04L 12/4641; H04L 41/0803; H04L 41/0806; H04L 41/0813;
(Continued)

(56) References Cited

U.S. PATENT DOCUMENTS 6,438,130 B1 8/2002 Kagan et al.
6,480,500 B1 11/2002 Erimli et al.
(Continued)

FOREIGN PATENT DOCUMENTS

CN 101807238 8/2010
CN 101826140 9/2010
(Continued)

OTHER PUBLICATIONS

United States Patent and Trademark Office, Supplemental Notice of Allowability dated Apr. 30, 2021 for U.S. Appl. No. 15/417,265, 6 pages.
(Continued)

*Primary Examiner* — Arvin Eskandarnia
(74) *Attorney, Agent, or Firm* — Tucker Ellis LLP

(57) ABSTRACT

System and method for correlating fabric-level group membership with subnet-level partition membership in a high performance computing environment. An exemplary embodiment can provide an admin partition in a subnet of a network environment, associated with a resource domain at the fabric level of the network environment. The admin partition can be defined by a P_Key that is stored in a fabric-level database. Each fabric resource is identified by an identifier that is stored in the fabric-level database. When fabric resources are added as members to the resource domain, a relationship is created between the P_Key and the identifier of the fabric resource, where the relationship defines the resource as a member of the admin partition. Access rights can be granted based on the relationship.

20 Claims, 16 Drawing Sheets

Related U.S. Application Data

(60) Provisional application No. 62/287,712, filed on Jan. 27, 2016.

(51) Int. Cl.

| | | |
|---|---|---|
| *H04L 49/65* | (2022.01) | |
| *H04L 41/12* | (2022.01) | |
| *H04L 41/50* | (2022.01) | |
| *H04L 9/40* | (2022.01) | |
| *H04L 61/5038* | (2022.01) | |
| *H04L 41/0813* | (2022.01) | |
| *H04L 67/10* | (2022.01) | |
| *H04L 67/00* | (2022.01) | |
| *H04L 12/46* | (2006.01) | |
| *H04L 41/0803* | (2022.01) | |
| *H04L 41/22* | (2022.01) | |
| *H04L 41/0806* | (2022.01) | |
| *H04L 45/64* | (2022.01) | |
| *H04L 47/70* | (2022.01) | |
| *G06F 9/455* | (2018.01) | |
| *G06F 12/0806* | (2016.01) | |
| *G06F 13/40* | (2006.01) | |
| *G06F 9/48* | (2006.01) | |
| *G06F 9/50* | (2006.01) | |
| *H04L 101/645* | (2022.01) | |
| *H04L 101/668* | (2022.01) | |
| *H04L 45/48* | (2022.01) | |
| *H04L 67/01* | (2022.01) | |
| *H04L 45/586* | (2022.01) | |
| *H04L 49/00* | (2022.01) | |

(52) U.S. Cl.
CPC ........ *G06F 9/5077* (2013.01); *G06F 12/0806* (2013.01); *G06F 13/4022* (2013.01); *H04L 12/4641* (2013.01); *H04L 41/0803* (2013.01); *H04L 41/0806* (2013.01); *H04L 41/0813* (2013.01); *H04L 41/12* (2013.01); *H04L 41/22* (2013.01); *H04L 41/50* (2013.01); *H04L 45/64* (2013.01); *H04L 47/82* (2013.01); *H04L 49/358* (2013.01); *H04L 49/65* (2013.01); *H04L 61/5038* (2022.05); *H04L 63/10* (2013.01); *H04L 63/20* (2013.01); *H04L 67/10* (2013.01); *H04L 67/34* (2013.01); *G06F 2009/4557* (2013.01); *G06F 2009/45579* (2013.01); *G06F 2009/45583* (2013.01); *G06F 2009/45595* (2013.01); *H04L 45/48* (2013.01); *H04L 45/586* (2013.01); *H04L 49/70* (2013.01); *H04L 67/01* (2022.05); *H04L 2101/645* (2022.05); *H04L 2101/668* (2022.05)

(58) Field of Classification Search
CPC ......... H04L 41/12; H04L 41/22; H04L 41/50; H04L 45/64; H04L 47/82; H04L 49/358; H04L 49/65; H04L 61/2038; H04L 61/6045; H04L 61/6068; H04L 63/10; H04L 63/20; H04L 67/10; H04L 67/34; H04L 45/48; H04L 45/586; H04L 49/70; H04L 67/04; G06F 9/45558; G06F 9/4856; G06F 9/5077; G06F 12/0806; G06F 13/4022; G06F 2009/45583; G06F 2009/45595; G06F 2009/4557; G06F 2009/45579
See application file for complete search history.

(56) References Cited

U.S. PATENT DOCUMENTS

| | | |
|---|---|---|
| 6,594,712 B1 | 7/2003 | Pettey et al. |
| 6,718,392 B1 | 4/2004 | Krause |
| 6,941,350 B1 | 9/2005 | Frazier et al. |
| 7,010,600 B1 | 3/2006 | Prasad et al. |
| 7,010,633 B2 | 3/2006 | Arndt et al. |
| 7,093,024 B2 | 8/2006 | Craddock et al. |
| 7,103,626 B1 | 9/2006 | Recio et al. |
| 7,185,025 B2 | 2/2007 | Rosenstock et al. |
| 7,188,198 B2 | 3/2007 | Beukema et al. |
| 7,200,704 B2 | 4/2007 | Njoku et al. |
| 7,283,473 B2 | 10/2007 | Arndt et al. |
| 7,376,770 B2 | 5/2008 | Arndt et al. |
| 7,398,337 B2 | 7/2008 | Arndt et al. |
| 7,409,432 B1 | 8/2008 | Recio |
| 7,483,442 B1 | 1/2009 | Torudbaken et al. |
| 7,484,029 B2 | 1/2009 | Boyd et al. |
| 7,493,409 B2 | 2/2009 | Craddock et al. |
| 7,496,045 B2 | 2/2009 | Boyd et al. |
| 7,581,021 B2 | 8/2009 | Errickson et al. |
| 7,606,968 B2 | 10/2009 | Njoku et al. |
| 7,636,772 B1 | 12/2009 | Kirby et al. |
| 7,680,142 B1 | 3/2010 | Tvete |
| 7,783,788 B1 | 8/2010 | Quinn et al. |
| 7,802,000 B1 | 9/2010 | Huang et al. |
| 7,836,332 B2 | 11/2010 | Hara et al. |
| 7,865,633 B2 | 1/2011 | Wilkinson |
| 7,907,604 B2 | 3/2011 | Boyd et al. |
| 7,996,583 B2 | 8/2011 | Wilkinson |
| 8,009,589 B2 | 8/2011 | Burrow et al. |
| 8,014,387 B2 | 9/2011 | Arimilli et al. |
| 8,028,105 B2 | 9/2011 | Arndt et al. |
| 8,127,003 B2 | 2/2012 | Glaeser et al. |
| 8,165,136 B1 | 4/2012 | Sharma et al. |
| 8,185,896 B2 | 5/2012 | Arimilli et al. |
| 8,331,381 B2 | 12/2012 | Brown et al. |
| 8,407,702 B2 | 3/2013 | Ikegaya et al. |
| 8,677,023 B2 | 3/2014 | Venkataraghavan et al. |
| 8,700,811 B2 | 4/2014 | Oshins et al. |
| 8,713,649 B2 | 4/2014 | Johnsen et al. |
| 8,719,456 B2 | 5/2014 | Wilkinson |
| 8,751,649 B2 | 6/2014 | Villait et al. |
| 8,776,050 B2 | 7/2014 | Plouffe et al. |
| 8,824,279 B2 | 9/2014 | Gavrilov et al. |
| 8,989,187 B2 | 3/2015 | Saraiya et al. |
| 9,219,718 B2 | 12/2015 | Johnsen et al. |
| 9,268,798 B2 | 2/2016 | de Lavarene et al. |
| 9,369,334 B2 | 6/2016 | Gavrilov et al. |
| 9,397,960 B2 | 7/2016 | Arad et al. |
| 9,438,479 B1 | 9/2016 | Friedman et al. |
| 9,497,080 B1 | 11/2016 | Friedman et al. |
| 9,529,878 B2 | 12/2016 | Johnsen et al. |
| 9,537,798 B1 | 1/2017 | Devilbiss et al. |
| 9,582,319 B2 | 2/2017 | Ayala, Jr. et al. |
| 9,602,573 B1 | 3/2017 | Abu-Ghazaleh et al. |
| 9,628,374 B1 | 4/2017 | Devilbiss et al. |
| 9,800,471 B2 | 10/2017 | Arndt et al. |
| 10,038,592 B2 | 7/2018 | Guntaka et al. |
| 10,225,185 B2 | 3/2019 | Chen et al. |
| 10,503,442 B2 | 12/2019 | Kollu et al. |
| 10,592,453 B2 | 3/2020 | Lieber et al. |
| 10,659,340 B2 | 5/2020 | Johnsen et al. |
| 10,666,611 B2 | 5/2020 | Johnsen et al. |
| 10,700,971 B2 | 6/2020 | Johnsen et al. |
| 2003/0005039 A1 | 1/2003 | Craddock et al. |
| 2003/0061379 A1 | 3/2003 | Craddock et al. |
| 2003/0093627 A1 | 5/2003 | Neal |
| 2003/0101158 A1 | 5/2003 | Pinto et al. |
| 2003/0172149 A1 | 9/2003 | Edsall et al. |
| 2003/0208572 A1 | 11/2003 | Shah et al. |
| 2004/0030763 A1 | 2/2004 | Manter et al. |
| 2004/0054866 A1 | 3/2004 | Blumenau et al. |
| 2004/0202189 A1 | 10/2004 | Arndt et al. |
| 2004/0215848 A1 | 10/2004 | Craddock et al. |
| 2005/0044205 A1 | 2/2005 | Sankaranarayan et al. |
| 2005/0044301 A1 | 2/2005 | Vasilevsky et al. |

(56) References Cited

U.S. PATENT DOCUMENTS

| | | |
|---|---|---|
| 2005/0060445 A1 | 3/2005 | Beukema et al. |
| 2005/0071709 A1 | 3/2005 | Rosenstock et al. |
| 2005/0100033 A1 | 5/2005 | Arndt et al. |
| 2005/0120160 A1 | 6/2005 | Plouffe et al. |
| 2006/0155880 A1 | 7/2006 | Elnozahy et al. |
| 2006/0230185 A1 | 10/2006 | Errickson et al. |
| 2006/0230219 A1 | 10/2006 | Njoku et al. |
| 2007/0058619 A1 | 3/2007 | Gopal Gowda et al. |
| 2007/0081544 A1 | 4/2007 | Sakai et al. |
| 2007/0140266 A1 | 6/2007 | Njoku et al. |
| 2008/0059686 A1 | 3/2008 | Wilkinson |
| 2008/0114961 A1 | 5/2008 | Ramaswamy et al. |
| 2008/0117917 A1 | 5/2008 | Balay et al. |
| 2008/0186990 A1 | 8/2008 | Abali et al. |
| 2008/0189432 A1 | 8/2008 | Abali et al. |
| 2009/0031381 A1 | 1/2009 | Cohen et al. |
| 2009/0213753 A1 | 8/2009 | Burrow et al. |
| 2009/0216853 A1 | 8/2009 | Burrow et al. |
| 2010/0030995 A1 | 2/2010 | Wang |
| 2010/0114841 A1 | 5/2010 | Holenstein et al. |
| 2010/0145963 A1 | 6/2010 | Morris |
| 2012/0047313 A1 | 2/2012 | Sinha et al. |
| 2012/0079143 A1 | 3/2012 | Krishnamurthi et al. |
| 2012/0300940 A1 | 11/2012 | Sabin et al. |
| 2012/0307682 A1 | 12/2012 | Johnsen et al. |
| 2012/0311123 A1 | 12/2012 | Johnsen et al. |
| 2012/0311143 A1 | 12/2012 | Johnsen et al. |
| 2012/0311682 A1 | 12/2012 | Johnsen et al. |
| 2013/0019303 A1 | 1/2013 | Johnsen et al. |
| 2013/0051232 A1 | 2/2013 | Gavrilov et al. |
| 2013/0054947 A1 | 2/2013 | Gavrilov |
| 2013/0138758 A1 | 5/2013 | Cohen et al. |
| 2013/0138836 A1 | 5/2013 | Cohen et al. |
| 2013/0138971 A1 | 5/2013 | Budko et al. |
| 2013/0254321 A1 | 9/2013 | Johnsen et al. |
| 2013/0254368 A1 | 9/2013 | Guay et al. |
| 2013/0254404 A1 | 9/2013 | Johnsen et al. |
| 2013/0311465 A1 | 11/2013 | Muramoto |
| 2014/0032228 A1 | 1/2014 | Johri et al. |
| 2014/0059195 A1 | 2/2014 | Sajeepa |
| 2014/0064287 A1 | 3/2014 | Bogdanski et al. |
| 2014/0122675 A1 | 5/2014 | Cohen et al. |
| 2014/0122761 A1 | 5/2014 | Nagendra et al. |
| 2014/0195666 A1 | 7/2014 | Dumitriu et al. |
| 2014/0237156 A1 | 8/2014 | Regula et al. |
| 2014/0241355 A1 | 8/2014 | Tsirkin |
| 2014/0379756 A1 | 12/2014 | Shivarudraiah et al. |
| 2015/0026213 A1 | 1/2015 | Hegde et al. |
| 2015/0063356 A1 | 3/2015 | Makhervaks et al. |
| 2015/0135255 A1* | 5/2015 | Theimer ............ H04L 67/1027 726/1 |
| 2015/0248298 A1 | 9/2015 | Gavrilov |
| 2015/0249579 A1 | 9/2015 | Ellsworth et al. |
| 2015/0286600 A1 | 10/2015 | Kaufmann et al. |
| 2015/0338909 A1 | 11/2015 | Woodruff |
| 2016/0005444 A1 | 1/2016 | Chun et al. |
| 2016/0013973 A1 | 1/2016 | Onoue |
| 2016/0072816 A1 | 3/2016 | Makhervaks et al. |
| 2016/0218929 A1 | 7/2016 | Bhuyan |
| 2016/0285706 A1 | 9/2016 | Rao |
| 2016/0301610 A1 | 10/2016 | Amit et al. |
| 2017/0005961 A1 | 1/2017 | Strandzhev et al. |
| 2017/0024261 A1 | 1/2017 | Atluri et al. |
| 2017/0083559 A1 | 3/2017 | Cohoon |
| 2017/0187629 A1 | 6/2017 | Shalev et al. |
| 2017/0212778 A1 | 7/2017 | Johnsen et al. |
| 2017/0214570 A1 | 7/2017 | Holen et al. |
| 2017/0214633 A1 | 7/2017 | Johnsen et al. |
| 2017/0214736 A1 | 7/2017 | Johnsen et al. |
| 2017/0214766 A1 | 7/2017 | Hoeg et al. |
| 2017/0214767 A1 | 7/2017 | Johnsen et al. |
| 2017/0339106 A1 | 11/2017 | Rimmer et al. |

FOREIGN PATENT DOCUMENTS

| | | | |
|---|---|---|---|
| CN | 102483718 | 5/2012 | |
| CN | 102763063 | 10/2012 | |
| CN | 104094230 | 10/2014 | |
| CN | 104094231 | 10/2014 | |
| CN | 104871153 A | * 8/2015 | ......... G06F 16/2282 |
| JP | 2004531175 | 10/2004 | |
| JP | 2015518602 | 5/2015 | |
| JP | 2015531175 | 7/2015 | |
| WO | 2013009846 | 1/2013 | |
| WO | 2016069773 | 5/2016 | |

OTHER PUBLICATIONS

United States Patent and Trademark Office, Notice of Allowance and Fee(s) Due dated May 13, 2021 for U.S. Appl. No. 16/582,229, 12 pages.

Isci, et al., "Improving server utilization using fast virtual machine migration", IBM Journal of Research and Development, vol. 55, No. 6, Paper 4, Nov./Dec. 2011, 12 pages.

Liang, et al., "Swapping to Remote Memory over InfiniBand: An Approach using a High Performance Network Block Device", 2005 IEEE International Conference on Cluster Computing, 2005, 10 pages.

Liu, et al., "Evaluating InfiniBand Performance with PCI Express", IEEE Micro, Feb. 2005, 10 pages.

Oden, et al., "Infiniband-Verbs on GPU: A case study of controlling an Infiniband network device from the GPU", 2014 IEEE 28th International Parallel & Distributed Processing Symposium Workshops, May 2014, 9 pages.

Ye, et al., "Research of message passing technology based on infiniband architecture", Journal of Sichuan University, Apr. 2014, 1 page.

Zhou, et al., "Multicast in Fat-Tree-Based InfiniBand Networks", Proceedings of the 2005 4th IEEE International Symposium on Network Computing and Applications, 4 pages.

Japanese Patent Office, Office Action dated Dec. 8, 2020 for Japanese Patent Application No. 2018-510731, 5 pages.

United States Patent and Trademark Office, Notice of Allowance dated Jan. 7, 2021 for U.S. Appl. No. 15/417,265, 6 pages.

Chinese Patent Office, Office Action dated Jan. 11, 2021 for Chinese Patent Application No. 201780002466.7, 6 pages.

United States Patent and Trademark Office, Notice of Allowance dated Jan. 13, 2021 for U.S. Appl. No. 16/417,316, 7 pages.

Benslimane, et al., "Dynamic Clustering-Based Adaptive Mobile Gateway Management in Integrated VANET—3G Heterogeneous Wireless Networks", IEEE Journal on Selected Areas in Communications, vol. 29, No. 3, Mar. 2011, pp. 559-570, 12 pages.

Ho, Shen Ben; "CMPE: Cluster-Management & Power-Efficient Protocol for Wireless Sensor Networks", San Jose State University, May 2004, 185 pages.

Kim, et al., "A Leader Management Scheme for Fault-tolerant Multiple Subnets", 2009 Fifth International Joint Conference on INC, IMS and IDC, pp. 9-12, 4 pages.

Indian Patent Office, First Examination Report dated Sep. 17, 2020 for Indian Patent Application No. 201747042605, 7 pages.

United States Patent and Trademark Office, Notice of Allowance dated Nov. 25, 2020 for U.S. Appl. No. 15/417,289, 11 pages.

United States Patent and Trademark Office, Office Action dated Nov. 25, 2020 for U.S. Appl. No. 16/796,629, 14 pages.

Wang, et al., "Virtual Machine Auto-configuration for Web Application", 29th International Performance Computing and Communications Conference, Dec. 2010, 2 pages.

Japanese Patent Office, Office Action dated Feb. 24, 2021 for Japanese Patent Application No. 2018-510841, 5 pages.

United States Patent and Trademark Office, Office Action dated Mar. 31, 2021 for U.S. Appl. No. 16/796,629, 16 pages.

United States Patent and Trademark Office, Office Communication dated Feb. 2, 2022 for U.S. Appl. No. 17/226,665, 15 pages.

United States Patent and Trademark Office, Notice of Allowance and Fee(s) Due dated Oct. 4, 2021 for U.S. Appl. No. 16/796,629, 10 pages.

(56) References Cited

OTHER PUBLICATIONS

Martyshkin, A.I. et al., "Queueing Theory to Describe Adaptive Mathematical Models of Computational Systems with Resource Virtualization and Model Verification by Similarly Configured Virtual Server" 2019 International Russian Automation Conference, © 2019, 6 pages.
Chinese Patent Office, Office Action dated Jun. 1, 2020 for Chinese Patent Application No. 201780002449.3, 9 pages.
United States Patent and Trademark Office, Office Action dated Jul. 30, 2020 for U.S. Appl. No. 16/582,229, 11 pages.
Indian Patent Office, First Examination Report dated Aug. 13, 2020 for Indian Patent Application No. 201747042604, 8 pages.
United States Patent and Trademark Office, Office Action dated Mar. 3, 2020 for U.S. Appl. No. 15/417,265, 19 pages.
United States Patent and Trademark Office, Office Action dated Apr. 13, 2020 for U.S. Appl. No. 15/417,289, 17 pages.
United States Patent and Trademark Office, Notice of Allowance dated Apr. 14, 2020 for U.S. Appl. No. 15/415,644, 8 pages.
United States Patent and Trademark Office, Notice of Allowance dated Apr. 30, 2020 for U.S. Appl. No. 16/238,345, 9 pages.
"Assigning a Fabric Profile to Devices and Ports"—Technical Documentation—Support—Juniper Networks, retrieved from https://www.juniper.net/...ation/en_US/junos-space-apps/network-director3.2/topics/task/configuration/fabric-profiles-assigning-editing.html on Jan. 25, 2019, 4 pages.
Guay, et al., "A Scalable Signalling Mechanism for VM Migration with SR-IOV over InfiniBand", 2012 IEEE 18th International Conference on Parallel and Distributed Systems, pp. 384-391, 8 pages.
"InfiniBand Architecture Specification vol. 1, Release 1.3", InfiniBand Trade Association, Mar. 3, 2015, 1842 pages.
Mauch, et al., "High performance cloud computing", Future Generation Computer Systems 29 (2013), pp. 1408-1416, 9 pages.
Oracle, "Delivering Application Performance with Oracle's InfiniBand Technology: A Standards-Based Interconnect for Application Scalability and Network Consolidation", An Oracle Technical White Paper, May 2012, 42 pages.
International Search Report and the Written Opinion of the International Searching Authority dated Apr. 11, 2017 for PCT Application No. PCT/US2017/015169, 14 pages.
International Search Report and the Written Opinion of the International Searching Authority dated Apr. 26, 2017 for PCT Application No. PCT/US2017/015442, 11 pages.
United States Patent and Trademark Office, Office Action dated Aug. 23, 2018 for U.S. Appl. No. 15/415,668, 18 pages.
United States Patent and Trademark Office, Notice of Allowance dated Aug. 28, 2018 for U.S. Appl. No. 15/417,281, 18 pages.
United States Patent and Trademark Office, Office Action dated Oct. 18, 2018 for U.S. Appl. No. 15/415,709, 26 pages.
United States Patent and Trademark Office, Office Action dated Nov. 1, 2018 for U.S. Appl. No. 15/415,683, 9 pages.
United States Patent and Trademark Office, Office Action dated Nov. 7, 2018 for U.S. Appl. No. 15/417,289, 15 pages.
United States Patent and Trademark Office, Office Action dated Dec. 14, 2018 for U.S. Appl. No. 15/417,265, 16 pages.
United States Patent and Trademark Office, Office Action dated Dec. 20, 2018 for U.S. Appl. No. 15/415,644, 18 pages.
United States Patent and Trademark Office, Notice of Allowance dated Jan. 18, 2019 for U.S. Appl. No. 15/417,305, 9 pages.
United States Patent and Trademark Office, Notice of Allowance dated Feb. 5, 2019 for U.S. Appl. No. 15/415,668, 18 pages.
United States Patent and Trademark Office, Office Action dated May 22, 2019 for U.S. Appl. No. 15/415,644, 19 pages.
United States Patent and Trademark Office, Notice of Allowance dated May 23, 2019 for U.S. Appl. No. 15/415,698, 8 pages.
United States Patent and Trademark Office, Notice of Allowance dated Jun. 26, 2019 for U.S. Appl. No. 15/415,683, 7 pages.
United States Patent and Trademark Office, Office Action dated Jun. 28, 2019 for U.S. Appl. No. 15/417,265, 18 pages.
United States Patent and Trademark Office, Office Action dated Jul. 15, 2019 for U.S. Appl. No. 15/417,289, 16 pages.
United States Patent and Trademark Office, Office Action dated Jan. 27, 2020 for U.S. Appl. No. 16/417,316, 13 pages.
United States Patent and Trademark Office, Office Action dated Feb. 6, 2020 for U.S. Appl. No. 16/238,345, 8 pages.

* cited by examiner

US 11,451,434 B2

SYSTEM AND METHOD FOR CORRELATING FABRIC-LEVEL GROUP MEMBERSHIP WITH SUBNET-LEVEL PARTITION MEMBERSHIP IN A HIGH-PERFORMANCE COMPUTING ENVIRONMENT

CLAIM OF PRIORITY AND CROSS REFERENCE TO RELATED APPLICATIONS

This application is a continuation of U.S. patent application entitled "SYSTEM AND METHOD FOR CORRELATING FABRIC-LEVEL GROUP MEMBERSHIP WITH SUBNET-LEVEL PARTITION MEMBERSHIP IN A HIGH PERFORMANCE COMPUTING ENVIRONMENT", application Ser. No. 15/415,620, filed on Jan. 25, 2017, which application claims the benefit of priority to U.S. Provisional patent application entitled "SYSTEM AND METHOD FOR PROVIDING USING ADMIN PARTITIONS TO CORRELATE RESOURCE ACCESS AND OWNERSHIP IN A HIGH PERFORMANCE COMPUTING ENVIRONMENT", Application No. 62/287,712, filed on Jan. 27, 2016, which are hereby incorporated by reference in its entirety.

This application is related to the following patent applications, each of which is hereby incorporated by reference in its entirety:

U.S. patent application entitled "SYSTEM AND METHOD OF ASSIGNING ADMIN PARTITION MEMBERSHIP BASED ON SWITCH CONNECTIVITY IN A HIGH-PERFORMANCE COMPUTING ENVIRONMENT", application Ser. No. 15/415,644, filed Jan. 25, 2017;

U.S. patent application entitled "SYSTEM AND METHOD FOR DEFINING VIRTUAL MACHINE FABRIC PROFILES OF VIRTUAL MACHINES IN A HIGH-PERFORMANCE COMPUTING ENVIRONMENT", application Ser. No. 15/415,668, filed Jan. 25, 2017;

U.S. patent application entitled "SYSTEM AND METHOD OF HOST-SIDE CONFIGURATION OF A HOST CHANNEL ADAPTER (HCA) IN A HIGH-PERFORMANCE COMPUTING ENVIRONMENT", application Ser. No. 15/415,683, filed Jan. 25, 2017;

U.S. patent application entitled "SYSTEM AND METHOD OF INITIATING VIRTUAL MACHINE CONFIGURATION ON A SUBORDINATE NODE FROM A PRIVILEGED NODE IN A HIGH-PERFORMANCE COMPUTING ENVIRONMENT", application Ser. No. 15/415,698, filed Jan. 25, 2017;

U.S. patent application entitled "SYSTEM AND METHOD FOR APPLICATION OF VIRTUAL HOST CHANNEL ADAPTER CONFIGURATION POLICIES IN A HIGH-PERFORMANCE COMPUTING ENVIRONMENT", application Ser. No. 15/415,709, filed Jan. 25, 2017.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting correlation between subnet-level and fabric-level management schemes.

BACKGROUND

As larger cloud computing architectures are introduced, the performance and administrative bottlenecks associated with the traditional network and storage have become a significant problem. There has been an increased interest in using high performance lossless interconnects such as InfiniBand™ (IB) technology as the foundation for a cloud computing fabric. This is the general area that embodiments of the invention are intended to address.

SUMMARY

Described herein are systems and methods for correlating fabric-level group membership with subnet-level partition membership in a high performance computing environment. An exemplary embodiment can provide an admin partition in a subnet of a network environment, associated with a resource domain at the fabric level of the network environment. The admin partition can be defined by a P_Key that is stored in a fabric-level database. Each fabric resource is identified by an identifier that is stored in the fabric-level database. When fabric resources are added as members to the resource domain, a relationship is created between the P_Key and the identifier of the fabric resource, where the relationship defines the resource as a member of the admin partition. Access rights can be granted based on the relationship.

DETAILED DESCRIPTION

Figure 1:
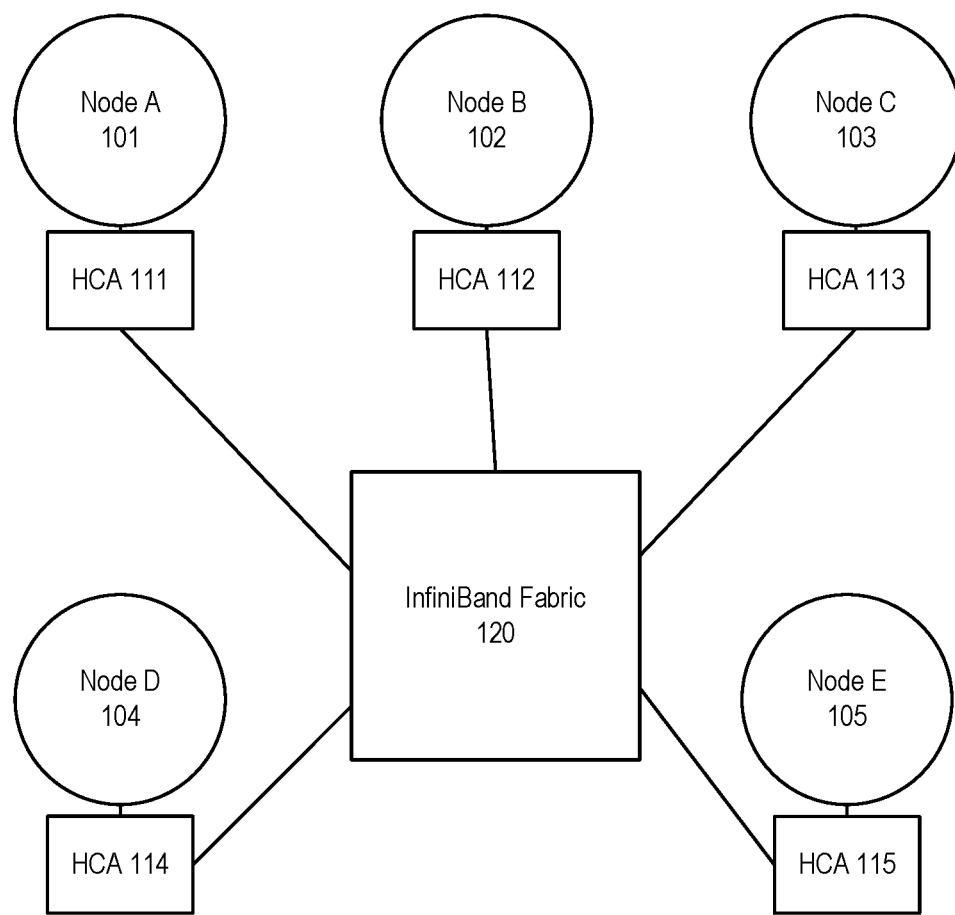
FIG. 1 shows an illustration of an InfiniBand™ environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for correlating fabric-level group membership with subnet-level partition membership in a high performance computing environment.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end-nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigures the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets in which the network changes occurred. Also, the segmenting of a large fabric with routers may limit the reconfiguration scope.

An example InfiniBand™ fabric is shown in FIG. 1, which shows an illustration of an InfiniBand™ environment 100, in accordance with an embodiment. In the example shown in FIG. 1, nodes A-E, 101-105, use the InfiniBand™ fabric 120 to communicate, via the respective host channel adapters 111-115. In accordance with an embodiment, the various nodes, e.g., nodes A-E 101-105, can be represented by various physical devices. In accordance with an embodiment, the various nodes, e.g., nodes A-E 101-105, can be represented by various virtual devices, such as virtual machines.

Partitioning in InfiniBand™

In accordance with an embodiment, IB networks can support partitioning as a security mechanism to provide for isolation of logical groups of systems sharing a network fabric. Each HCA port on a node in the fabric can be a member of one or more partitions. In accordance with an embodiment, the present disclosure provides for two types of partitions that can be defined within an IB subnet—data partitions (discussed in detail in the following paragraphs) and admin partitions (discussed in detail later in the disclosure).

Data partition memberships are managed by a centralized partition manager, which can be part of the SM. The SM can configure data partition membership information on each port as a table of 16-bit partition keys (P_Keys). The SM can also configure switch and router ports with the data partition enforcement tables containing P_Key information associated with the end-nodes that send or receive data traffic through these ports. Additionally, in a general case, data partition membership of a switch port can represent a union of all membership indirectly associated with LIDs routed via the port in an egress (towards the link) direction.

In accordance with an embodiment, data partitions are logical groups of ports such that the members of a group can only communicate to other members of the same logical group. At host channel adapters (HCAs) and switches, packets can be filtered using the data partition membership information to enforce isolation. Packets with invalid partitioning information can be dropped as soon as the packets reaches an incoming port. In partitioned IB systems, data partitions can be used to create tenant clusters. With data partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular data partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a data partition.

Figure 2:
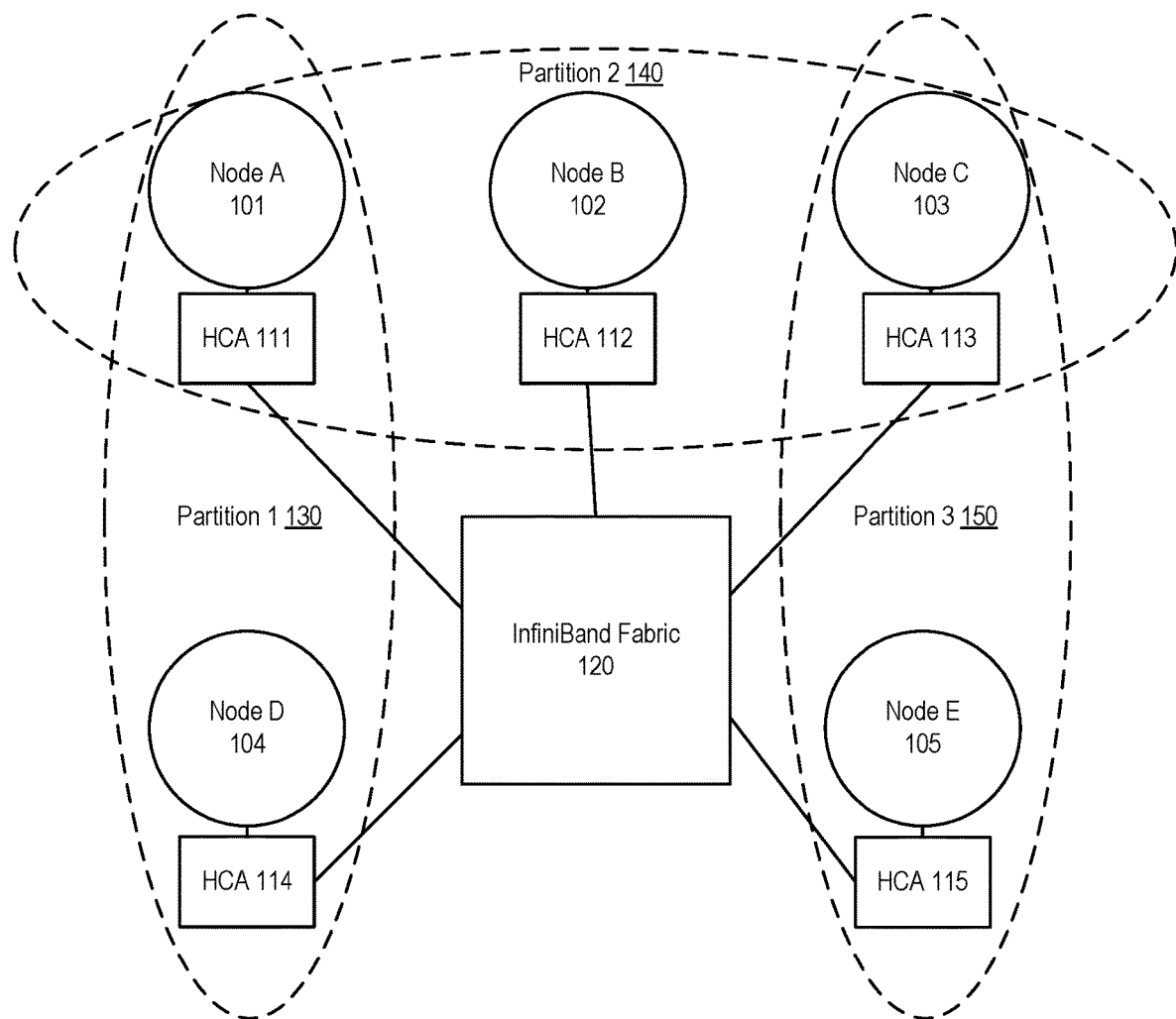
FIG. 2 shows an illustration of a partitioned cluster environment, in accordance with an embodiment

An example of IB data partitions is shown in FIG. 2, which shows an illustration of a data partitioned cluster environment, in accordance with an embodiment. In the example shown in FIG. 2, nodes A-E, 101-105, use the InfiniBand™ fabric, 120, to communicate, via the respective host channel adapters 111-115. The nodes A-E are arranged into data partitions, namely data partition 1, 130, data partition 2, 140, and data partition 3, 150. Data partition 1 comprises node A 101 and node D 104. Data partition 2 comprises node A 101, node B 102, and node C 103. Data partition 3 comprises node C 103 and node E 105. Because of the arrangement of the data partitions, node D 104 and node E 105 are not allowed to communicate as these nodes do not share a data partition. Meanwhile, for example, node A 101 and node C 103 are allowed to communicate as these nodes are both members of data partition 2, 140.

Virtual Machines in InfiniBand™

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand™ (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
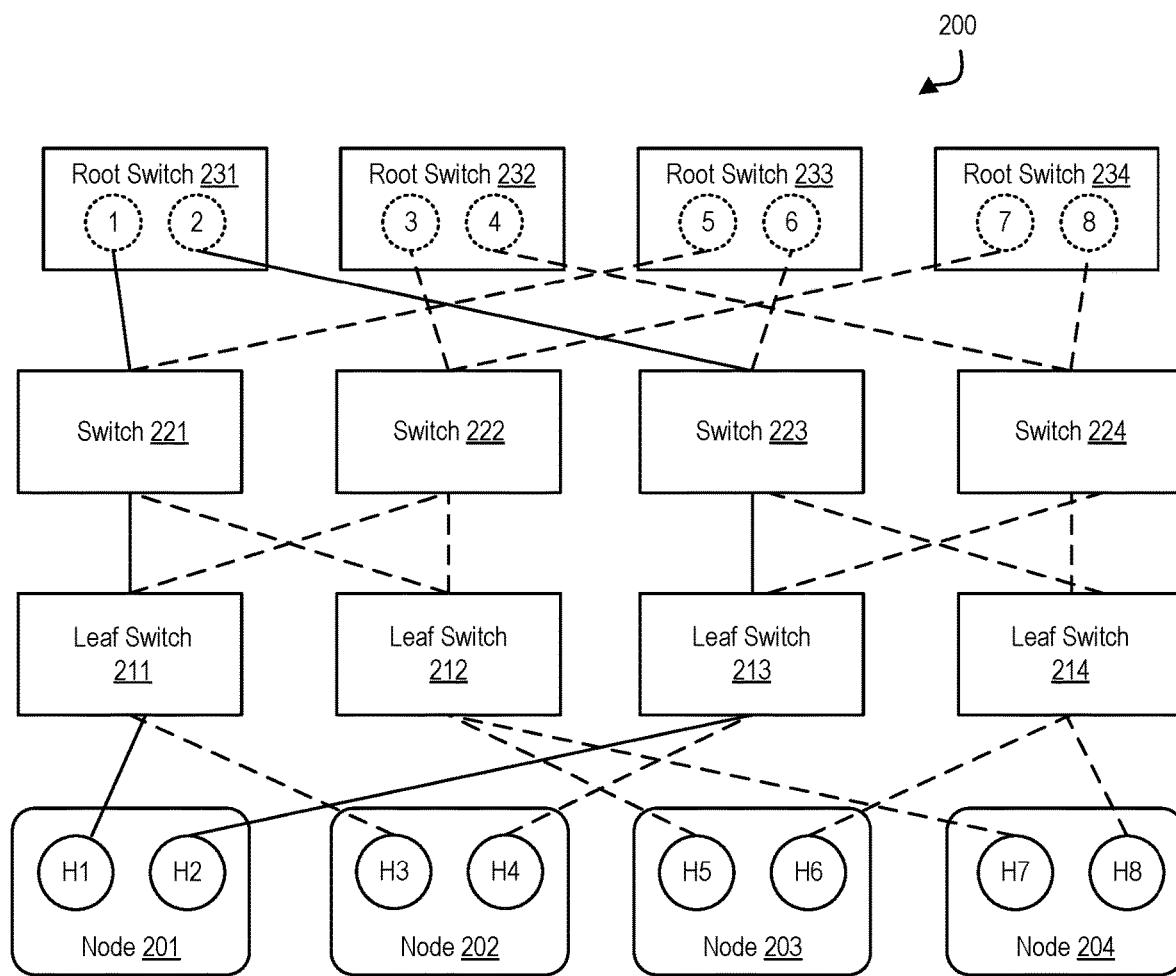
FIG. 3 shows an illustration of a tree topology in a network environment, in accordance with an embodiment.

FIG. 3 shows an illustration of a tree topology in a network environment, in accordance with an embodiment. As shown in FIG. 3, one or more end-nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end-nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end-nodes, and thus the corresponding routes, to each switch port. For the end-nodes connected to the same leaf switch, the indexing order can depend on the switch port to which the end-node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common data partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the data partitions, fat-tree routed subnets, in general, provide poor isolation among data partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end-nodes and $n \cdot k^{n-1}$ switches, each with 2k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand™ and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand™ SR-IOV Architecture—Shared Port

There can be different types of SR-IOV models, e.g. a shared port model, a virtual switch model, and a virtual port model.

Figure 4:
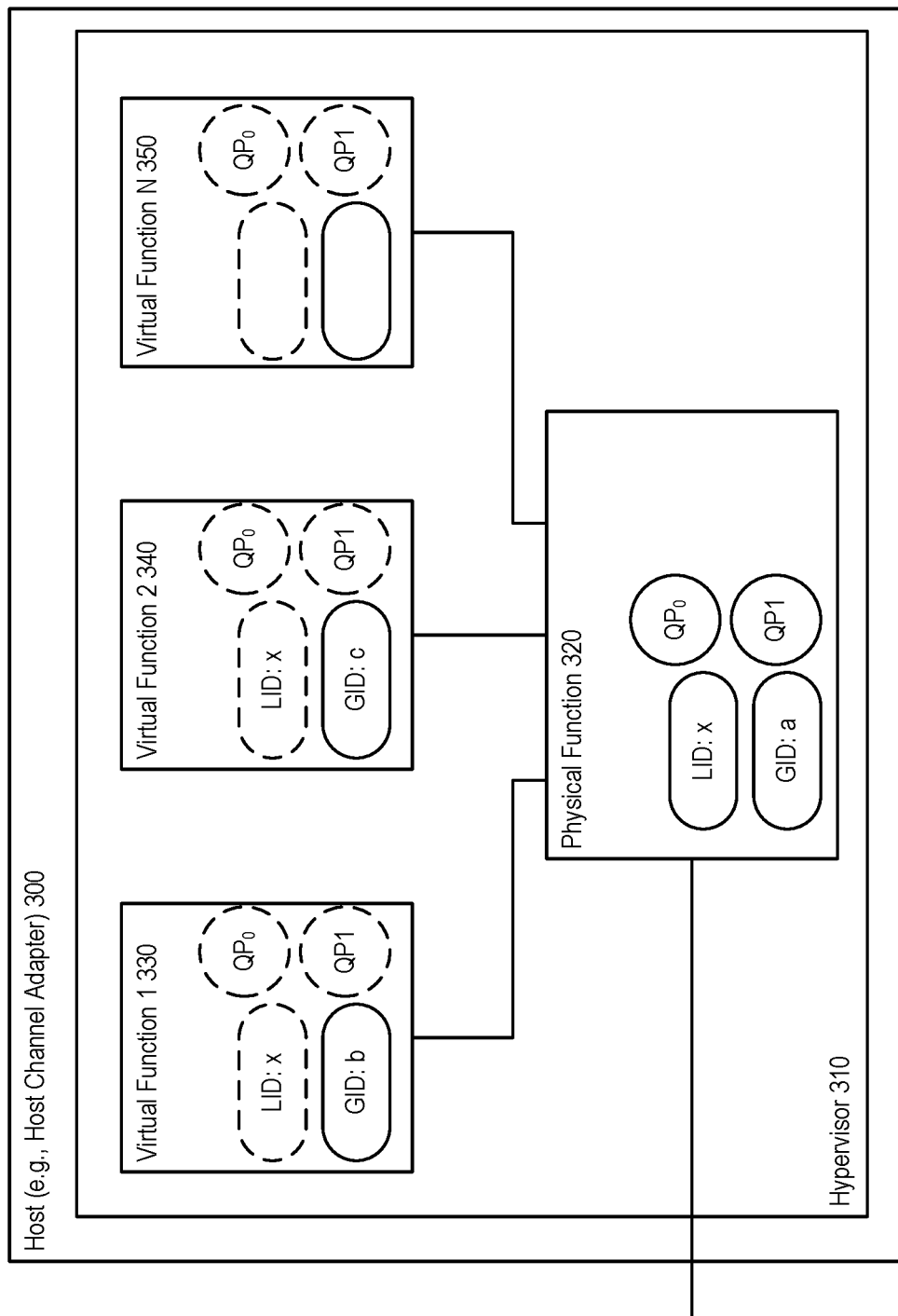
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand™ management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand™ SR-IOV Architecture Models—Virtual Switch (vSwitch)

Figure 5:
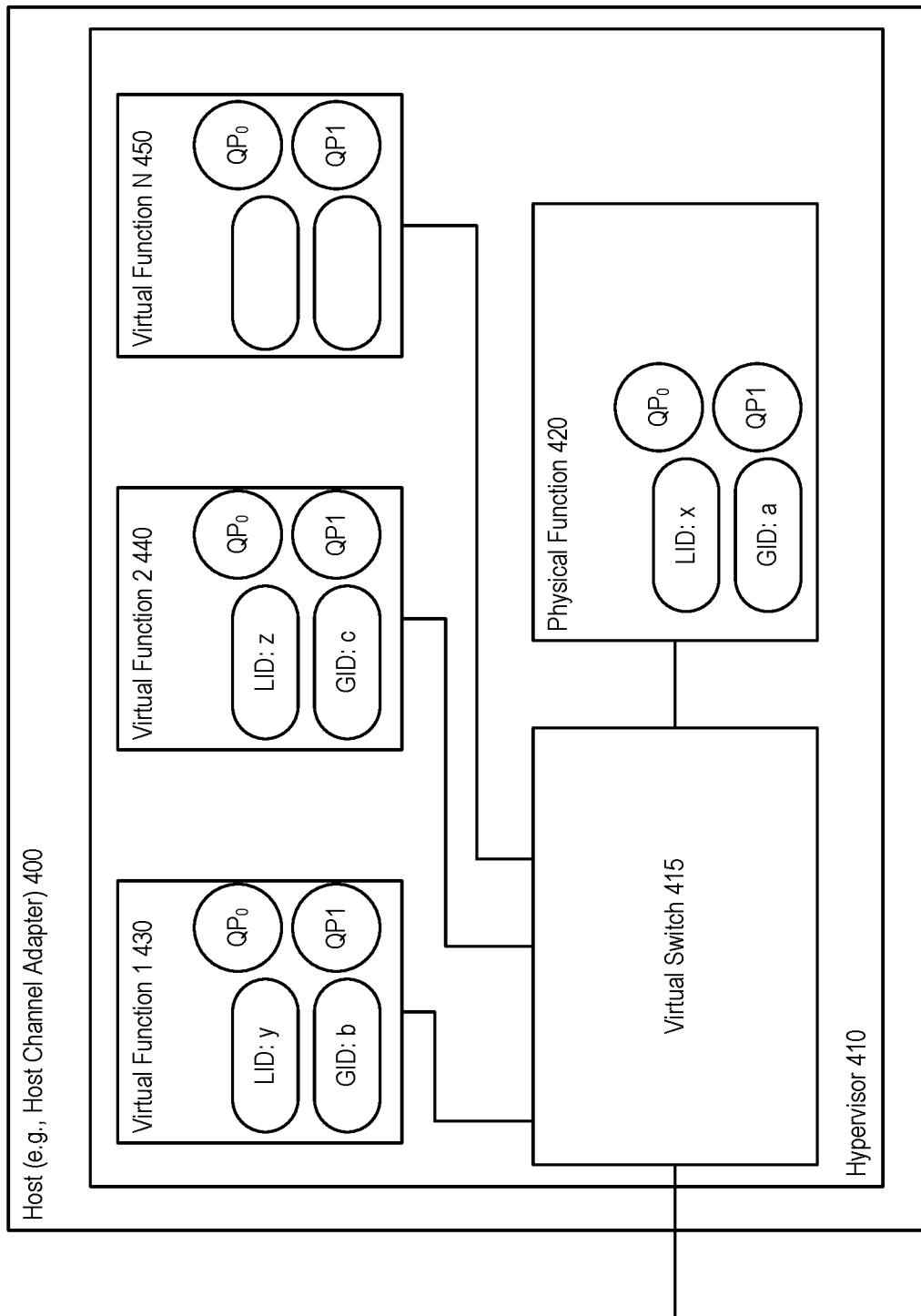
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand™ SR-IOV Architecture Models—Virtual Port (vPort)

Figure 6:
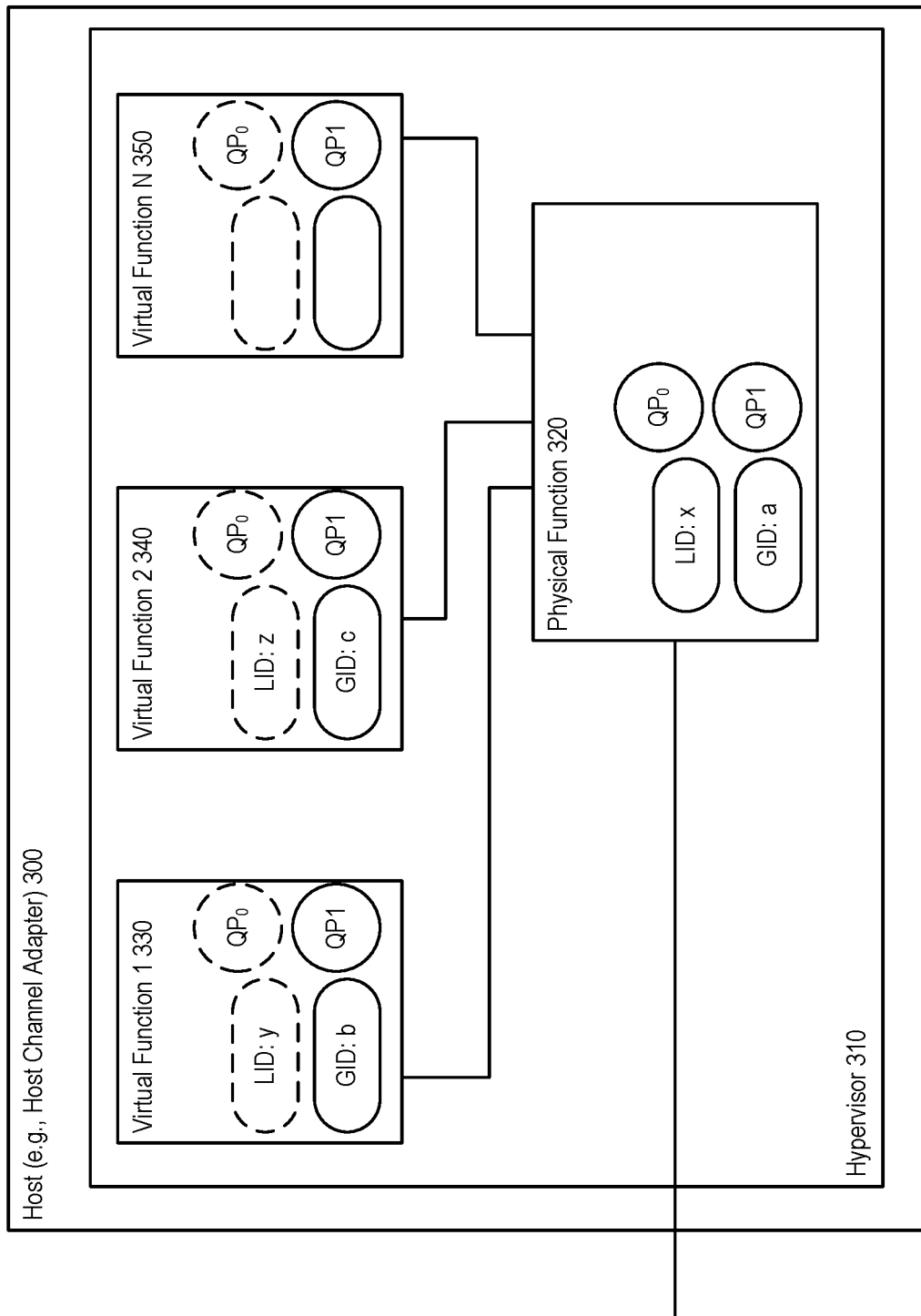
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand™ SR-IOV Architecture Models—vSwitch with Prepopulated LIDs

In accordance with an embodiment, the present disclosure provides a system and method for providing a vSwitch architecture with prepopulated LIDs.

Figure 7:
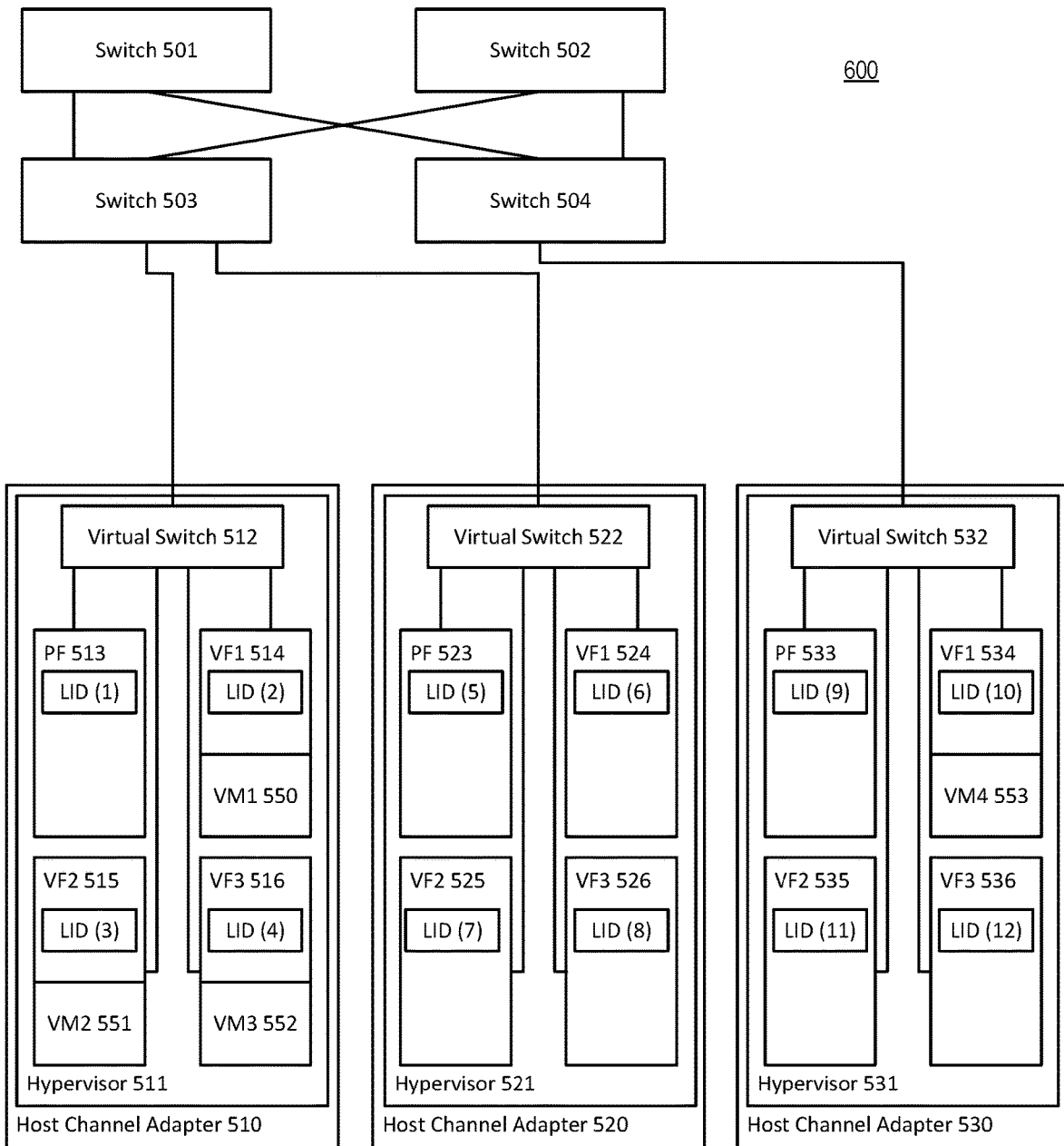
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand™ fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are smaller since each switch, router, or dedicated SM node in the IB subnet consumes a LID as well). Note that the vSwitch does not need to occupy an additional LID as it can share the LID with the PF.

In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand™ SR-IOV Architecture Models—vSwitch with Dynamic LID Assignment

In accordance with an embodiment, the present disclosure provides a system and method for providing a vSwitch architecture with dynamic LID assignment.

Figure 8:
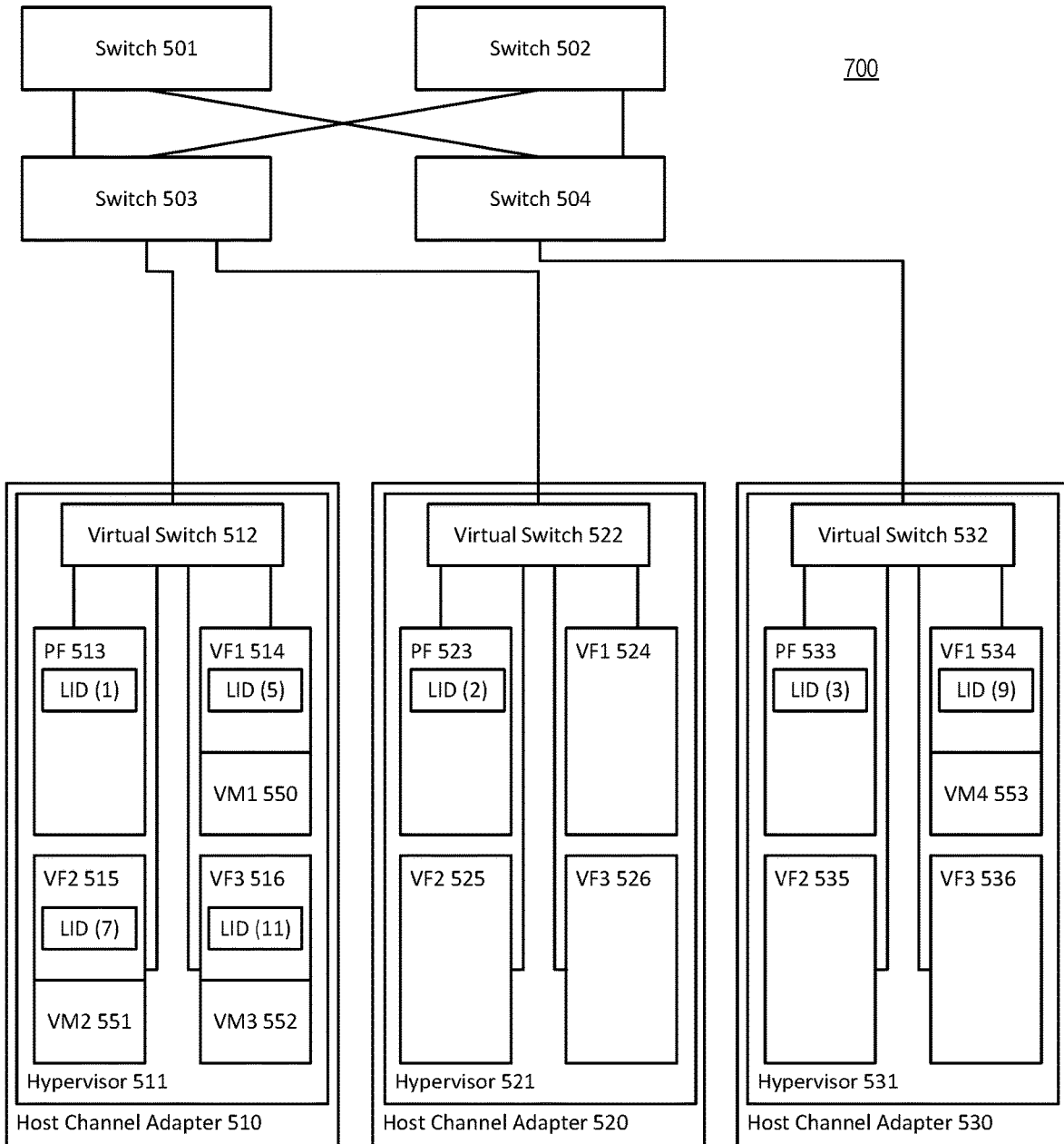
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand™ fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
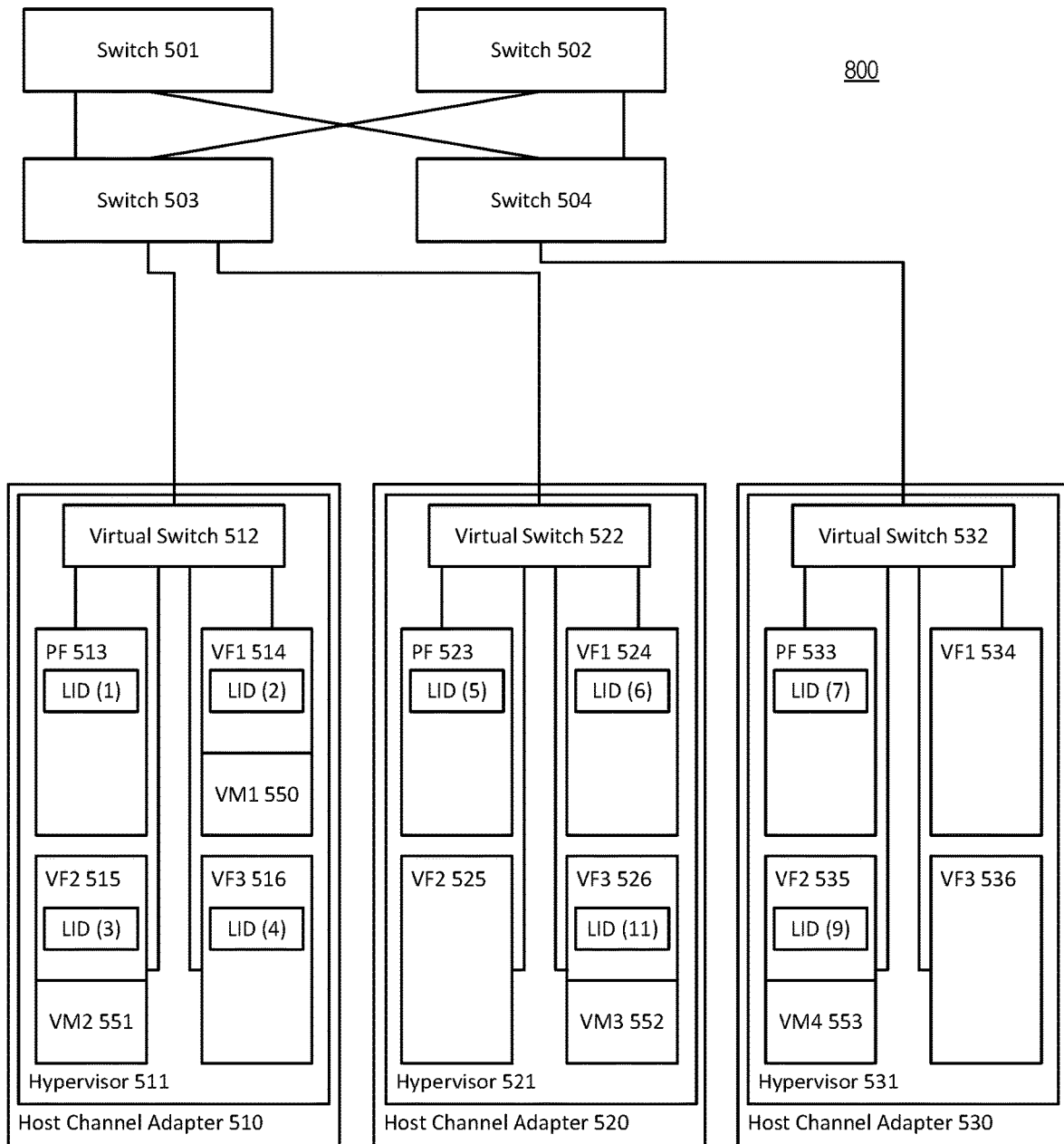
FIG. 9 shows an exemplary vSwitch architecture with vSwitch with dynamic LID assignment and prepopulated LIDs, in accordance with an embodiment.

InfiniBand™ SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand™ fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand™—Inter-Subnet Communication

In accordance with an embodiment, in addition to providing an InfiniBand™ fabric within a single subnet, embodiments of the current disclosure can also provide for an InfiniBand™ fabric that spans two or more subnets.

Figure 10:
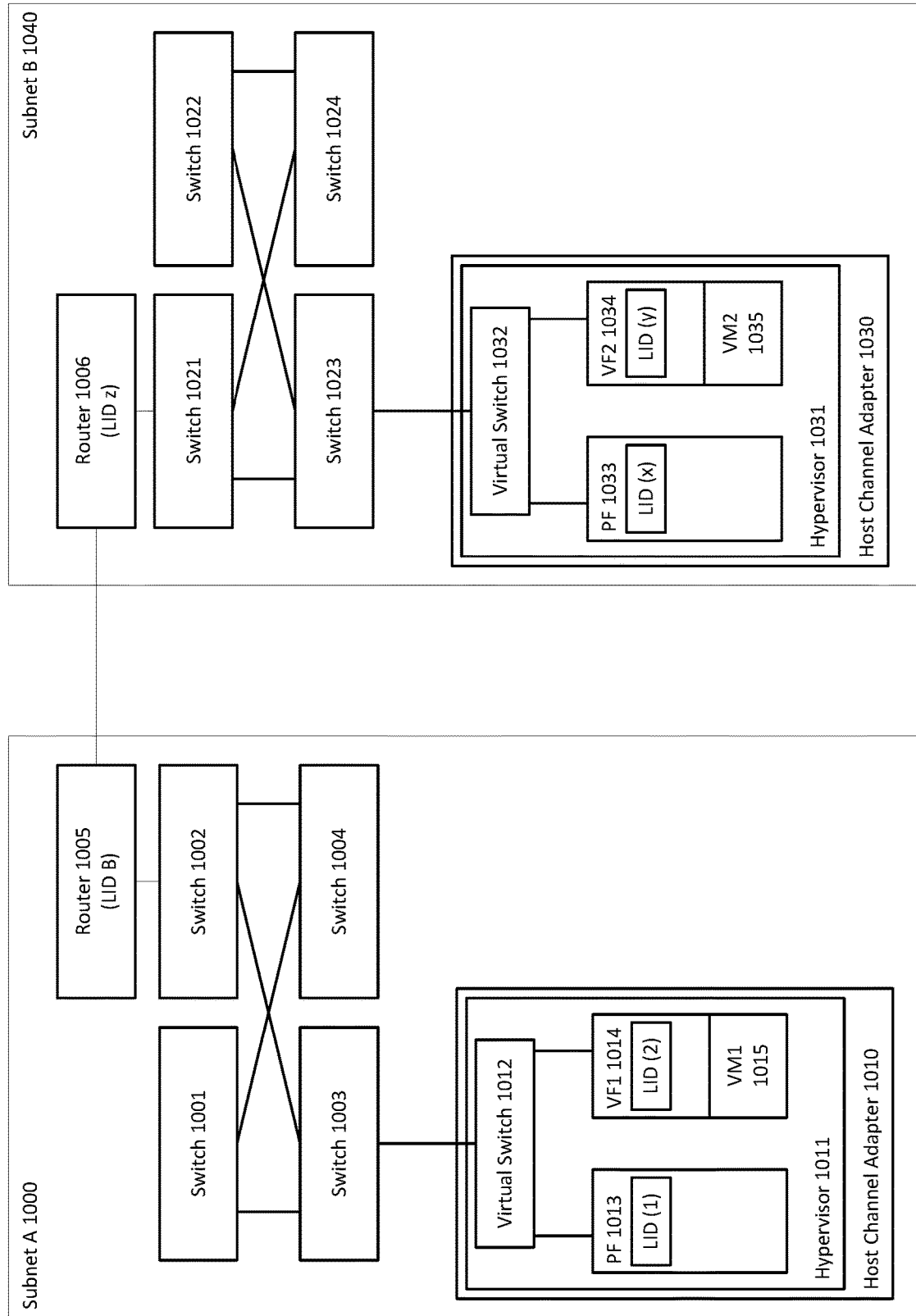
FIG. 10 shows an exemplary multi-subnet InfiniBand™ fabric, in accordance with an embodiment.

FIG. 10 shows an exemplary multi-subnet InfiniBand™ fabric, in accordance with an embodiment. As depicted in the figure, within subnet A 1000, a number of switches 1001-1004 can provide communication within subnet A 1000 (e.g., an IB subnet) between members of a fabric, such as an InfiniBand™ fabric. The fabric can include a number of hardware devices, such as, for example, channel adapter 1010. Host channel adapters 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters.

With further reference to FIG. 10, and in accordance with an embodiment, a number of switches 1021-1024 can provide communication within subnet B 1040 (e.g., an IB subnet) between members of a fabric, such as an InfiniBand™ fabric. The fabric can include a number of hardware devices, such as, for example, host channel adapter 1030. Host channel adapter 1030 can in turn interact with a hypervisor 1031. The hypervisor can, in turn, in conjunction with the host channel adapter it interacts with, setup a number of virtual functions 1034. The hypervisors can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that, although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, when traffic at an originating source, such as virtual machine 1 within subnet A, is addressed to a destination at a different subnet, such as virtual machine 2 within subnet B, the traffic can be addressed to the router within subnet A, i.e., router 1005, which can then pass the traffic to subnet B via its link with router 1006.

Fabric Manager

As discussed above, a network fabric, such as an InfiniBand™ fabric, can span a plurality of subnets through the use of interconnected routers in each subnet of the fabric. In accordance with an embodiment, a fabric manager (not shown) can be implemented on a host which is a member of the network fabric and can be employed within the fabric to manage both physical and logical resources that are part of the fabric. For instance, management tasks such as discovering fabric resources, controlling connectivity between physical servers, collecting and viewing real-time network statistics, disaster recovery, and setting quality of service (QoS) settings, among others, may be performed by a user through the fabric manager. In accordance with an embodiment, the fabric manager may span all subnets defined in the fabric. That is, the fabric manager can manage physical and logical resources that are members of, or associated with, the fabric at large, regardless of which subnet the resources are a member of.

In accordance with an embodiment, the fabric manager can include a graphical user interface (GUI) through which a user can perform administration functions. The fabric manager GUI can incorporate visualization tools that allow a user to monitor and control fabric resources. For example, in an embodiment, a user can view server connections, configuration settings and performance statistics for servers across the fabric through the fabric interface. Other examples of fabric functionality that can be monitored and/or managed through the fabric manger GUI include discovering inter-subnet fabric topology, viewing visual representations of these topologies, creating fabric profiles (e.g., virtual machine fabric profiles), and building and management of a fabric manager database that can store fabric profiles, metadata, configuration settings and other data required by, and related to, the network fabric. In accordance with an embodiment, the fabric manager database is a fabric-level database.

In addition, the fabric manager can define legal inter-subnet connectivity in terms of which subnets are allowed to communicate via which router ports using which partition numbers. In accordance with an embodiment, the fabric manager is a centralized fabric management utility. The above examples are not meant to be limiting.

In accordance with an embodiment, some of the fabric manager's functionality can be initiated by a user, and other functionality can be abstracted from the user, or be automated (e.g., some functionality may be performed by the fabric manager upon startup, or at other predetermined events).

In an exemplary embodiment of a management event, a user may initiate, at the fabric manger interface, a configuration change directed towards a network fabric device. After receiving the configuration change request, the fabric manager may, in turn, ensure that the configuration change request is properly carried out. For example, the fabric manager may communicate the request to the device and ensure that the configuration change is written to the device's configuration. In one embodiment, the physical device acknowledges to the fabric manager that the configuration change has successfully completed. In accordance with an embodiment, the fabric manager may then update the interface to give a visual confirmation that the request has been carried out. Further, the fabric manager may persist the configuration of the device to the fabric manager database, e.g., for disaster recovery or other purposes.

In accordance with an embodiment, the fabric manager can have other interfaces, such as a command line interface, that includes some, all, or more functionality than the GUI.

Fabric-Level Resource Domains

As discussed above, a fabric manager can allow users to perform administrative tasks throughout the network fabric through an interface of the fabric manager. In accordance with an embodiment, an additional function of the fabric manager is facilitation of hierarchical role-based access control. In an embodiment, role-based access control is achieved through fabric-level resource domains.

In accordance with an embodiment, role-based access control is based on the concept of fabric users. Access from both human administrators and external management applications can represent an authenticated context that defines legal operations on all or a subset of the fabric infrastructure or fabric resources. For example, a user can be represented in the fabric by a user profile. That is, within the fabric a user can be defined by creating a profile of the user and assigning attributes to the profile. A user profile can be assigned a username attribute, and a password attribute, where the username is unique within the fabric, thereby uniquely identifying the user. Further, the user profile may be associated with certain roles defined in the fabric that assign certain access levels to different resources within the fabric. In accordance with an embodiment, setting up user profiles can be accomplished through the fabric manager interface. All or part of the user profile can be stored in the fabric manger database. Moreover, in an embodiment, the fabric manager can integrate with well-known user directories, such as Microsoft's® Active Directory or LDAP directories, or with, e.g., the RADIUS networking protocol for remote authentication.

In accordance with an embodiment, the fabric manager can manage fabric resources that it discovers through fabric-level resource domains (also referred to as "resource domains", or simply "domains" herein). A resource domain is a logical grouping of fabric resources defined at the fabric level. Fabric resources include both physical and logical resources. Some examples of resources include fabric devices (such as HCAs, physical nodes, and switches), fabric profiles (such as virtual machine fabric profiles, and user profiles), virtual machines, clouds, and I/O modules, among others.

In accordance with an embodiment, all fabric resources discovered and managed by the fabric manager reside in the default domain, which exists by default (i.e., without the need to setup or configure it) in the fabric, and can be accessed through the fabric manager interface. The default domain is the highest level domain—that is, it is the parent domain to all other resource domains, and all other resource domains exist within the default domain. The default domain is associated with a fabric-level administrator, which also exists by default, and is configured with administrative privileges in the default domain by default.

In accordance with an embodiment, resource domains represent a hierarchical form of resource management. For example, the process of configuring and managing the default domain is available only to the fabric-level administrator. However, child domains can be created within the default domain by the fabric-level administrator. For instance, the fabric-level administrator can create a child domain and can add domain resources to the child domain. Additionally the fabric-level administrator can create domain-level "domain admin" users and add (i.e., associate) the domain admin users to the child domain. Making the domain admin user a member of the resource domain allows the domain admin user to manage the child domain and its contained subset of the fabric resources. In accordance with an embodiment, the domain admin user cannot manage resources outside of the child domain (i.e., resources at a parallel or a higher level than the domain admin is associated with). However the domain admin can manage resources contained in resource domains that have been created as child domains of the resource domain. In accordance with an embodiment, the fabric manager is responsible for providing the security that ensures that resource domain boundaries are strictly enforced.

Figure 11:
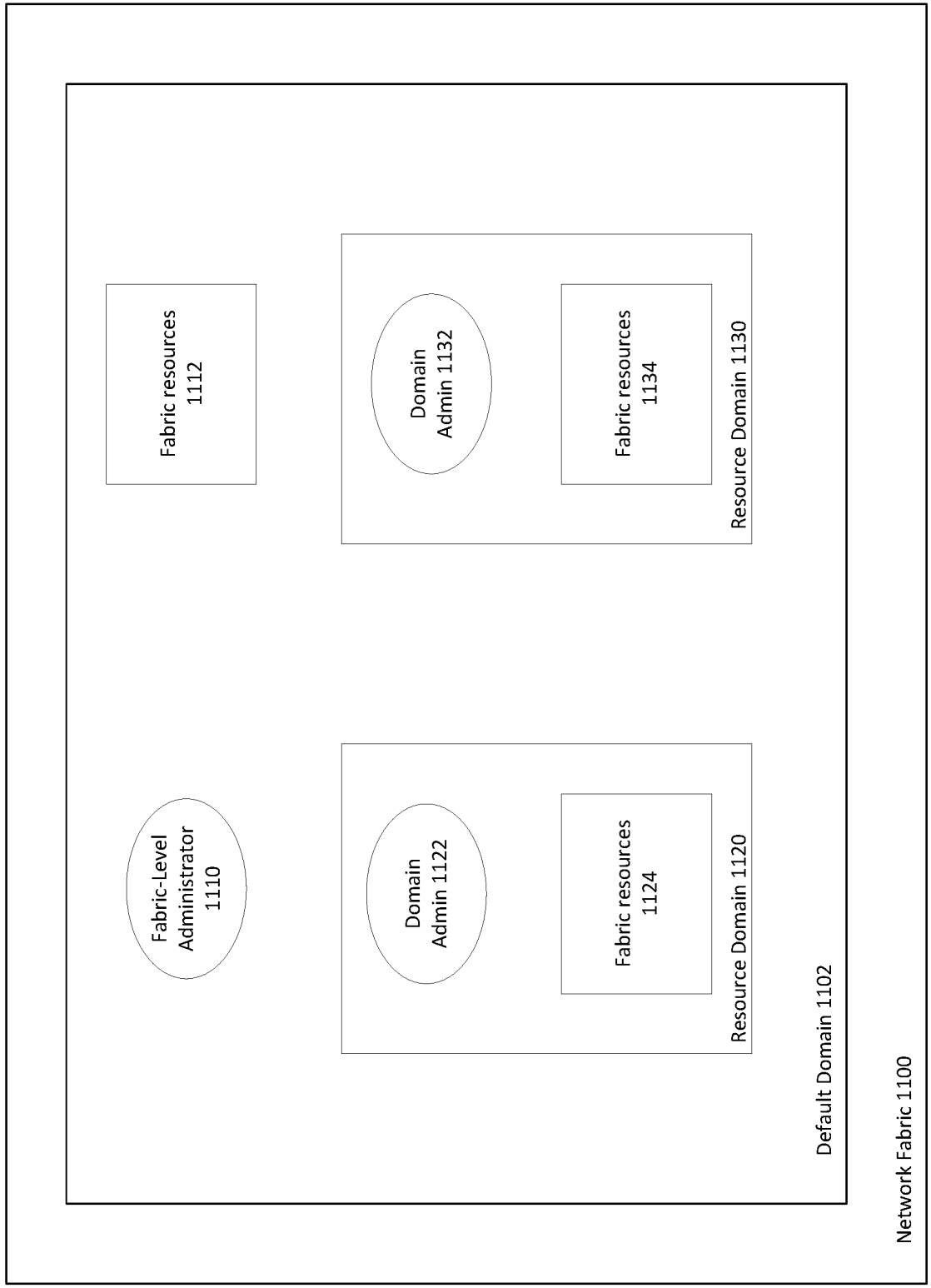
FIG. 11 shows the hierarchical structure of resource domains.

FIG. 11 shows the hierarchical structure of resource domains. As shown, default domain 1102 exists within network fabric 1100. Fabric-level administrator 1110 has access rights to manage fabric-level resources 1112, 1124, and 1134. Fabric-level administrator 1110 can also create and administer new resource domains within default domain 1102. Fabric-level administrator 1110 has created resource domain 1120 and 1130, and corresponding domain-level domain admin users 1122 and 1132. Domain admin user 1122 has access rights to manage fabric resources 1124 (assigned to resource domain 1120 by fabric-level administrator 1110), but has no access rights to manage fabric resources 1112 (at a higher level) or domain resources 1134 (at a parallel level). Likewise, Domain admin user 1132 has access rights to manage fabric resources 1134 (assigned to resource domain 1130 by Fabric-level administrator 1110), but has no access rights to manage fabric resources 1112 (at a higher level) or domain resources 1124 (at a parallel level).

Admin Partitions

In accordance with an embodiment, a resource domain can be represented at the subnet level by an administration, or "admin" partition (as they are referred to herein). An admin partition represents a group membership which grants access rights at the subnet level to subnet resources. Members of an admin partition are considered privileged, in that the members have access rights to any subnet resources that are associated with the admin partition, in accordance with an embodiment. At the fabric manager level, an admin partition is associated with a resource domain and a corresponding domain admin user. Thus, user-role separation can be ensured in multi-tenant environments at the subnet level. Further, resource domain membership can be correlated with admin partition membership, so that resources that are members of an admin partition that is associated with a particular resource domain are also members of the resource domain.

In accordance with an embodiment, an admin partition can be defined at the subnet level in the same way that a data partition is defined, but with an additional attribute specifying that the partition being created is an admin partition. Like data partitions (discussed in detail, above), admin partitions can be created by an administrator through the fabric manager interface, in accordance with an embodiment. In an embodiment, the fabric manager can support an "admin partition" flag as an optional parameter during the creation of a partition. If selected by the creating administrator, the fabric manager will include the additional attribute specifying that the newly created partition is an admin partition, and will be treated as an admin partition by the fabric manager and the local master subnet manager.

In accordance with an embodiment, the fabric manager can be configured to automatically create a corresponding admin partition for each resource domain that is created, and associate the automatically created partition with the corresponding resource domain. In such an embodiment, when fabric-level resources are added to the resource domain, the fabric manager also associates them with the admin partition that was automatically created and associated with the resource domain. Thus, resources added to the resource domain will have subnet-level access rights to each other upon being added to the resource domain, with no further action being taken by the administrator (e.g., the fabric-level administrator or the domain admin).

Moreover, in accordance with an embodiment, entire subnets of the network can represent a special resource domain in a domain hierarchy that has a top-level domain (e.g., the default domain). For instance, in a domain hierarchy, where the default domain represents the top-level domain, each subnet of the network fabric can then be recognized by the fabric manager as a child domain of the default domain. Recognition of entire subnets as child domains of a top-level domain can be configured as default behavior of the fabric manager, or these default domains can be manually defined by an administrator. Here again, in order to have user role separation and enforcement of domain boundaries and resource associations at the subnet level, admin partitions corresponding to entire-subnet resource domains can be defined. In accordance with an embodiment, an admin partition that is defined in a subnet and includes each resource in that subnet (as either a member, or associated with the admin partition) can be termed a "domain global" admin partition, since in this configuration, every resource in the subnet would have access rights to every other resource.

In accordance with an embodiment, an admin partition can be transparent to a domain admin. As noted above, a domain global admin partition can be created automatically for a resource domain at the fabric manager level, and then all resources assigned to or created within the scope of this domain can automatically be associated with the corresponding admin partition. In another embodiment, however, the domain admin can explicitly create different admin partitions within the relevant resource domain, and then resources within the domain can be explicitly associated with the explicitly created admin partition instead of with the admin partition that was created by default for the resource domain.

In accordance with an embodiment, the fabric manager can support the creation of both shared and private admin partitions. Admin partitions created by a fabric-level administrator in the default domain can be shared partitions that can be made available to individual resource domains. Admin partitions created by a domain admin (i.e., a user with credentials associated with a specific resource domain) in the domain in which the domain admin is a member can be private partitions associated with and available only to the specific resource domain in whose context the admin partitions were created.

In accordance with an embodiment, end-ports of HCAs and vHCAs can be members of an admin partition, just as they can be members of a data partition. Admin partitions are differentiated from data partitions, however, in that admin partitions can be associated with other subnet resources, in accordance with an embodiment. For example, a data partition can be associated with an admin partition. Further, an admin partition can be associated with another admin partition, as a child or as a parent, thus making admin partitions a hierarchical concept and able to correspond with the hierarchy of the resource domains they are associated with, in accordance with an embodiment.

As a technical matter, end-ports of HCAs (and vHCAs) can be referred to as "members" of partitions, in traditional terminology, and other resources can be "associated with" admin partitions, in accordance with an embodiment. The technical differences in these two concepts are explained below. For convenience and readability, however, this document may occasionally, in reference to admin partitions, use the terms "member" and "associated with" interchangeably. Notwithstanding the use of these terms interchangeably, it is to be understood that the technical differences between end-port/HCA membership in, and resource association with, admin partitions is meant to be consistently applied by the reader.

In accordance with an embodiment, an admin partition is defined by a P_Key, just as a data partition is defined. However, while an end-port is aware of the data partitions that it is a member of, it is not necessary that end-ports be aware of what admin partitions they are members of. Thus, in one embodiment, a P_Key defining an admin partition is not entered in the P_Key table of member end-ports. In this way the creation of an admin partition does not waste P_Key table entries—which are a limited resource—if an admin partition is not used for IB packet traffic. In another embodiment, however, an admin partition may function as both an admin partition and a data partition. In such an embodiment, all P_Key tables of end-ports that are members of the admin partition can have a P_Key entry for the admin partition in their respective P_Key tables. In accordance with an embodiment, a data partition may be defined as any partition that is not also an admin partition.

In accordance with an embodiment, a data partition can be associated with one or more admin partitions. For example, a data partition, being defined by a P_Key value, can be associated with an admin partition that is defined by its own distinct P_Key value. Moreover, the data partition can be associated with a second admin partition defined by yet another distinct P_Key value. In accordance with an embodiment, the association of a data partition with a specific admin partition can define the maximum membership level for end-ports that are members of the specific admin partition.

As noted above, an admin partition represents a group membership which grants access rights to subnet resources. In accordance with an embodiment, any end-port member of an admin partition has access rights to any subnet resource that is associated with the same admin partition based solely on the end-port's membership in the admin partition. Thus, any end-port that is a member of an admin partition has access rights to any data partition that is associated with that same admin partition. Notably, this does not necessarily mean that the member end-port is a member of the associated data partition, but that it has access rights to the associated data partition, and therefore could be a member of the data partition.

Such a scheme obviates the need for administrators to grant end-ports access to, e.g., data partitions by manually including the data partition's P_Key in the P_Key table of the end-port. In an embodiment, when an end-port is initialized in the subnet, the master subnet manager can query a data store (e.g., an admin partition registry, as discussed below) that holds admin partition definitions (e.g., P_Keys), and relationships that define membership in the defined admin partitions and that define associations with the defined admin partitions, to determine which admin partitions the end-port is a member of. The subnet manager can then further check to see if there are any data partitions associated with the admin partitions of which the end-port is a member. If the SM finds that 1) the end-port is a member of an admin partition, and 2) that that admin partition is associated with a data partition, then the SM can automatically place the P_Key of the associated data partition in the P_Key table of the end-port, thereby automatically granting the end-port access to the data partition. Thus, the admin partition represents a simpler, more scalable solution than manual partition mapping by administrators.

Figure 12:
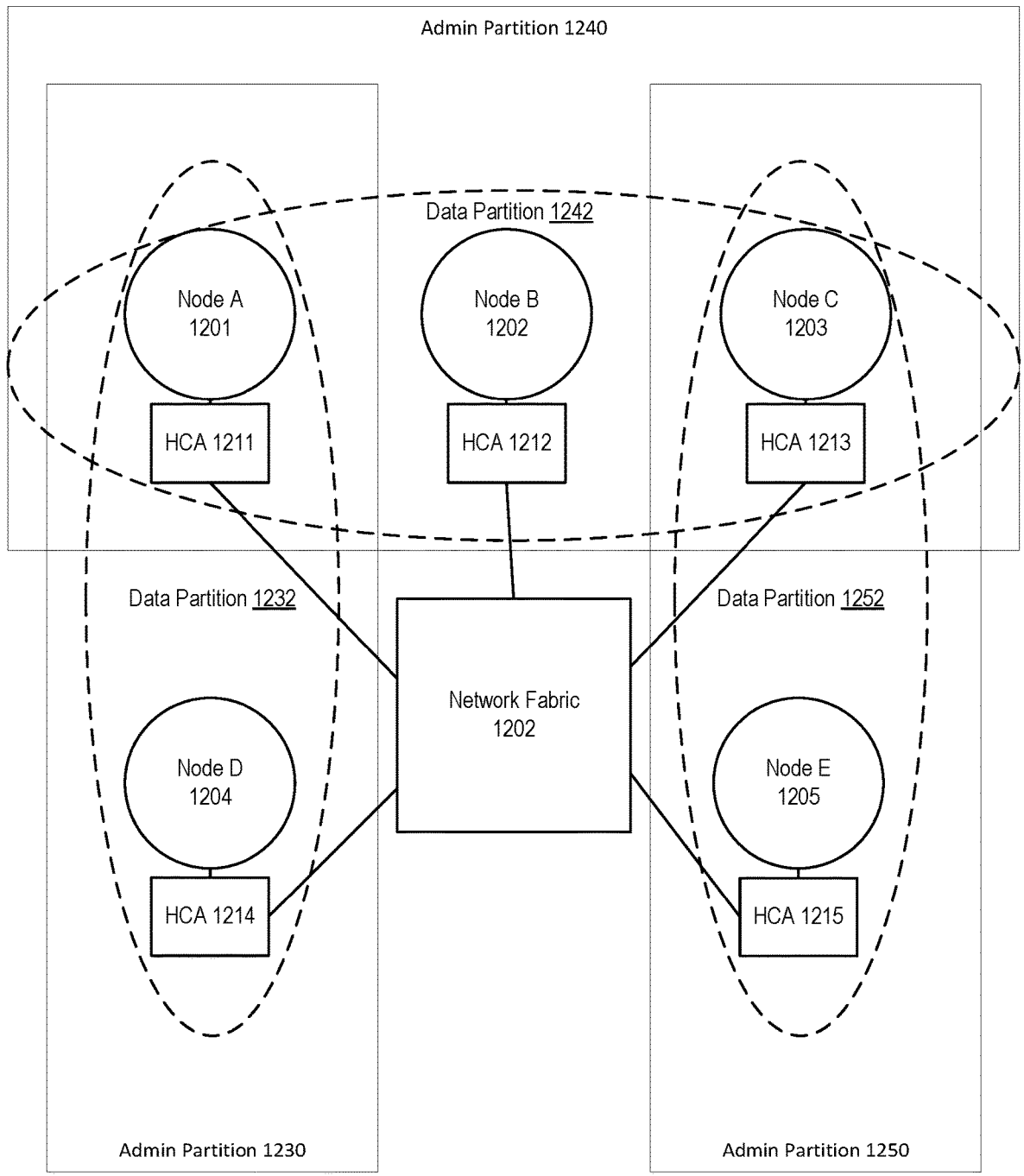
FIG. 12 shows an exemplary network fabric having both admin partitions and data partitions.

FIG. 12 shows an exemplary network fabric having both admin partitions and data partitions. As shown in FIG. 12, admin partitions 1230, 1240, and 1250 have been defined within the fabric. Nodes A-E 1201-1205, are physically connected to the fabric by their respective HCAs 1211-1215. Additionally, each HCA is a member of at least one admin partition. HCA 1211 and HCA 1214 are members of admin partition 1230. HCA 1211 is also a member of admin partition 1240, along with HCAs 1212 and 1213. HCA 1213 is, additionally, a member of admin partition 1250, along with HCA 1215.

With further reference to FIG. 12, and in accordance with an embodiment, data partitions 1232, 1242, and 1252 have been defined within the fabric. Data partition 1232 is associated with admin partition 1230, data partition 1242 is associated with admin partition 1240, and data partition 1252 is associated with admin partition 1250. In accordance with an embodiment, HCA 1211 and HCA 1214 have access rights to membership in data partition 1232 based on their membership in admin partition 1230. Likewise, HCAs 1211-1213 have access rights to membership in data partition 1242 based on their membership in admin partition 1240. Moreover, HCAs 1213 and 1215 have access rights to membership in data partition 1252 based on their membership in admin partition 1250.

In accordance with an embodiment, admin partitions can also be used to determine whether a vHCA can be registered with the virtual function of a physical HCA. A vHCA describes a host channel adapter which is planned and configured for a specific virtual machine (VM), in accordance with an embodiment. A vHCA differs from a virtual function (VF) in that a vHCA migrates with a VM, while a VF stays with the physical adapter. As discussed above, however, both physical HCAs and vHCAs (and, at a lower level, the end-ports of these (v)HCAs) can be members of admin partitions. Thus, in accordance with an embodiment, admin partition membership can be used by the SM to determine whether a request from a physical HCA to register a vHCA with a virtual function of the requesting physical HCA is permissible.

Figure 13:
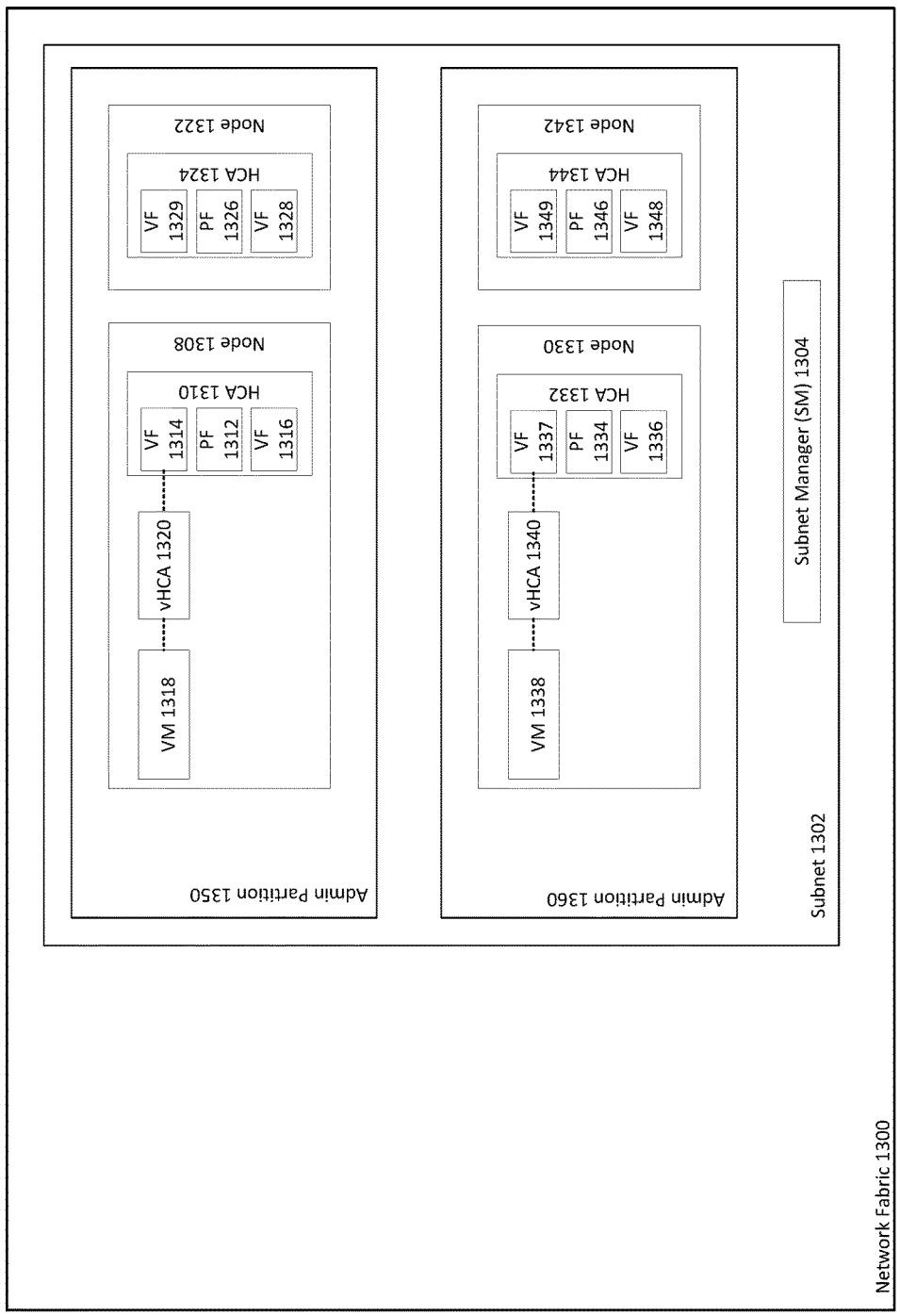
FIG. 13 shows an exemplary network fabric having HCAs and vHCAs as members of admin partitions.

FIG. 13 shows an exemplary network fabric having HCAs and vHCAs as members of admin partitions. As shown in FIG. 13, subnet 1302 is part of network fabric 1300. HCA 1310, 1324, 1332, and 1344 represent physical HCAs physically connected through their respective end-ports to network fabric 1300 in subnet 1302. HCA 1310 is associated with physical function (PF) 1312 and with virtual functions (VFs) 1314 and 1316. HCA 1324 is associated with PF 1326 and with VFs 1328 and 1329. HCA 1332 is associated with PF 1334 and with VFs 1336 and 1338. HCA 1344 is associated with PF 1346 and with VFs 1348 and 1349. Further, vHCA 1320 is depicted as registered with VF 1314, and associated with Virtual machine (VM) 1318 (i.e., VM 1318 obtains access to network fabric 1300 through vHCA 1320, and ultimately through physical HCA 1310). vHCA 1340 is registered VF 1337, and associated with VM 1338.

With continued reference to FIG. 13, as shown, HCAs 1310 and 1324, and vHCA 1320 are members of admin partition 1350. Additionally, HCA 1332 and 1344, and vHCA 1340 are members of admin partition 1360. Consequently, vHCA 1320 can be legally registered with VF 1314 or 1316 of HCA 1310, or with VF 1328 or 1329 of HCA 1324, by virtue of the fact that HCA 1310 and 1324, and vHCA 1320 are each members of admin partition 1350. Similarly, vHCA 1340 can be legally registered with VF 1336 or 1338 of HCA 1330, or with VF 1348 or 1349 of HCA 1344, by virtue of the fact that HCA 1332 and 1324, and vHCA 1340 are each members of admin partition 1360.

As noted above, the fabric-level fabric database holds information related to the fabric and fabric resources, and is managed by the fabric manager. In accordance with an embodiment, the fabric database can have "complete knowledge" of the fabric resource inventory (i.e., every resource that is a part of the network fabric is represented, at least, by a record held in the fabric database). Further, the access rights and name spaces associated with each resource in the fabric can be either stored in the fabric database, or derived from information and relationships contained in the fabric database.

For example, in accordance with an embodiment, information pertaining to admin partition membership and/or resource association with an admin partition can be stored in the fabric database. The tables holding this information and the relationships that link these tables together can be a subset of the fabric database, and can be referred to as the admin partition registry. In accordance with an embodiment, the admin partition registry is a collection of admin partition group resources. For example, an admin partition group within the admin partition registry can be a collection of HCA members (including vHCAs) and associated resources of a particular admin partition, where the group is looked up by the P_Key that defines the particular admin partition. Moreover, admin partition group members and associated resources can be looked up in the registry using keys such as GUID or vGUID for member HCAs or vHCAs, respectively, or P_Keys for associated data partitions. Relationships between the P_Key of an admin partition and the unique identifier of members or associated resources define membership or association, respectively, in the admin partition, and are maintained by the admin partition registry, and by the fabric database, at a higher level.

In accordance with an embodiment, all or part of the admin partition registry may held as records in a cache of the SM. For instance, records of the admin partition registry that correspond to resources of a particular subnet can be duplicated in a cache in a resident memory of a subnet manager (e.g., the master subnet manager) of the particular subnet. The admin partition registry records can either be retrieved (i.e., copied) from the fabric database by the SM (e.g., when the SM boots), or be placed in the cache before it is persisted to the fabric database. The cache can be a volatile or non-volatile memory. Regardless of when the registry records are placed in the cache, synchronization can then occur between the cached copy of the admin partition registry and the copy of the admin partition registry found in a fabric-level data base.

By holding all, or a subnet-relevant part, of the admin partition registry in a high-speed cache on the SM, rather than retrieving admin partition information from a persisted state (i.e., from the fabric database) every time a query is received, the lookup of admin partition information can impose minimal overhead on the SM. This can be especially important during subnet initialization, when access rights among subnet resources are being automatically assigned.

In accordance with an embodiment, logical names or identifiers can be assigned to resources within a resource domain (by, e.g., the fabric-level or domain-level admin user). These logical names can be private to the resource domain. The fabric manager, through the fabric database, can create relationships that map unique identifiers used within the fabric (e.g., vGUIDs and P_Keys) to logical or symbolic names given to resources within the fabric.

For instance, the fabric database, in accordance with an embodiment, can store records of resources, and domain membership and/or admin partition membership of resources. Logical names can be assigned to the resources upon discovery of the resources by the fabric manger. These names can be linked to the unique identifiers of the fabric resources in the fabric database. Moreover, the fabric manager can keep track of each resource's membership in resource domains and admin partitions through a relationship in the fabric manager database. With these records and relationships, the fabric manager can allow like logical names across disparate resource domains and admin partitions. In accordance with an embodiment, the logical domain name scheme can reflect the hierarchy of the resource domain or domains that a particular domain resource is a member of. In such an embodiment, logical resource names can be unique to the highest level resource domain that the resource is a member of.

In accordance with an embodiment, the identifier of a resource in the fabric—regardless of what the identifier is—can be unique within the scope of the admin partition. Then, global uniqueness (i.e., at the fabric level) can be achieved by prefixing the resource name with the corresponding admin partition.

Figure 14:
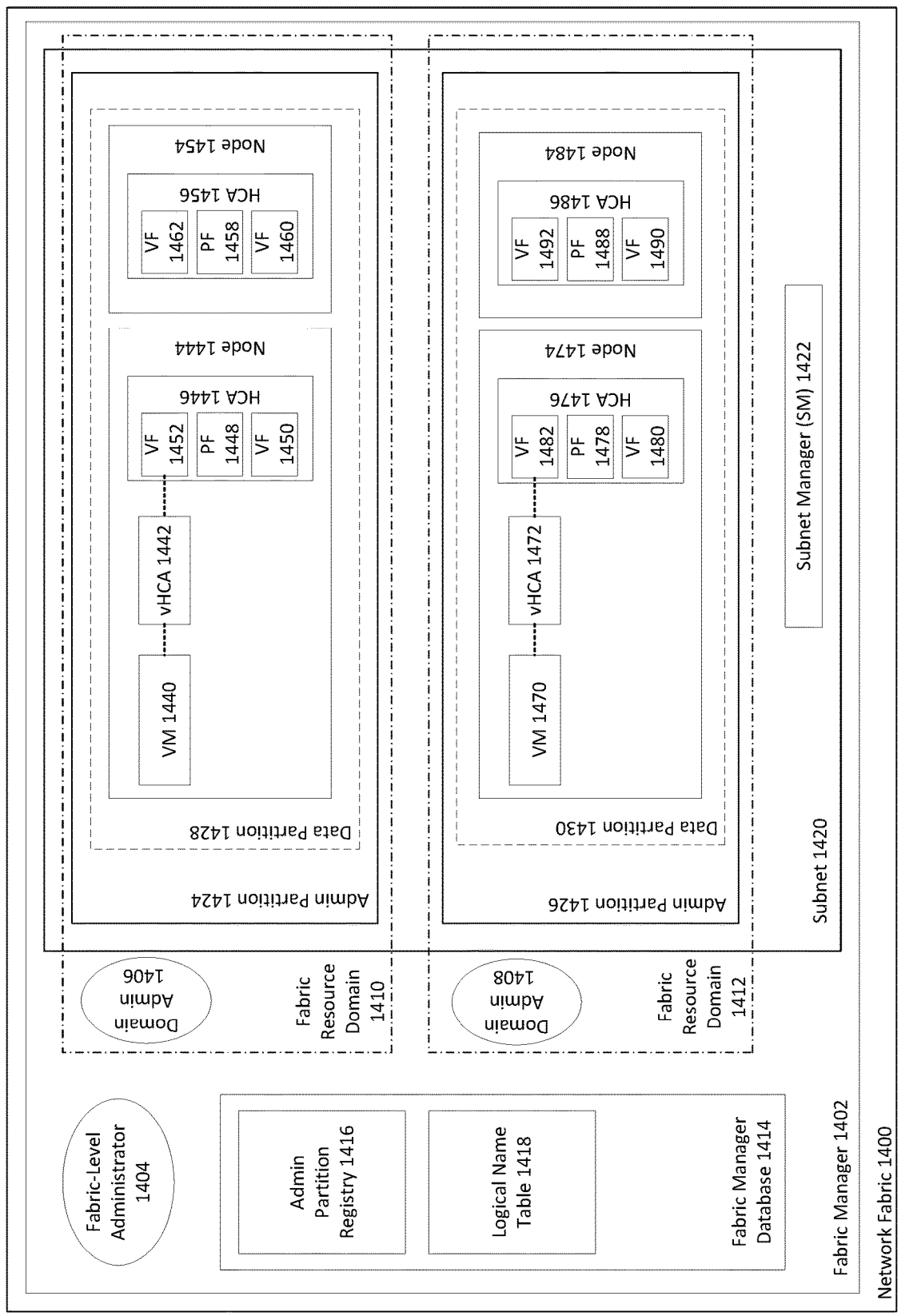
FIG. 14 shows an exemplary network fabric having both resource domains and admin partitions.

FIG. 14 shows an exemplary network fabric having both resource domains and admin partitions. As shown in FIG. 14, fabric manager 1402 is executing on network fabric 1400. In accordance with an embodiment, fabric manager 1402 can execute from a node (not shown) of network fabric 1400. Fabric manager 1402 is administered by fabric-level administrator 1404, and includes fabric manager database 1414. Admin partition registry 1416 is part of fabric manager database 1414, as is a logical name table 1418.

With continued reference to FIG. 14, subnet 1420 is defined within network fabric 1400. Subnet manager 1422 is associated with subnet 1420, and, in accordance with an embodiment, performs the semantic runtime operations required by subnet 1420 for operation in network fabric 1400. Setup and administrative tasks required by subnet 1420 can be performed by fabric-level administrator 1404 and fabric manager 1402.

Node 1444, 1454, 1474 and 1484 are part of subnet 1420. HCA 1446 is associated with node 1444, and includes PF 1448 and VFs 1450 and 1452. Similarly, HCA 1456 is associated with node 1454, and includes PF 1458 and VFs 1460 and 1462. HCA 1476 is associated with node 1474, and includes PF 1478 and VFs 1480 and 1482. Further, HCA 1486 is associated with node 1484, and includes PF 1488 and VFs 1490 and 1492. VM 1440 is executing on node 1444, and VM 1470 is executing on node 1474. vHCA 1442 has been planned and configured for VM 1440, is associated with VM 1440, and is registered with virtual function 1452 of HCA 1446. vHCA 1472 has been planned and configured for VM 1470, is associated with VM 1470, and is registered with virtual function 1482 of HCA 1476.

In accordance with an embodiment, HCAs 1446, 1456, 1476, and 1486 are considered domain resources, and a record of each is stored in fabric manager database 1414. The record can include an identifier, such as a GUID, which is used to identify the HCA resource in the fabric. Further, vHCAs 1442 and 1472 are also considered domain resources, and a record of each is stored in fabric manager database 1414. The record can include an identifier, such as a GUID, which is used to identify the vHCA.

With further reference to FIG. 14, and in accordance with an embodiment, resource domain 1410 and resource domain 1412 have been created within fabric manager 1402. In accordance with an embodiment, fabric-level administrator 1404 is responsible for the creation of resource domain 1410 and resource domain 1412. Additionally, domain admin 1406 is a domain-level administrator associated with resource domain 1410. Likewise, domain admin 1408 is a domain-level administrator associated with resource domain 1412. In accordance with an embodiment, fabric-level administrator 1404 can create domain admins 1406 and 1408, as admins of their respective resource domains, adhering to the hierarchical nature of resource domains.

In accordance with an embodiment, admin partition 1424 and admin partition 1426 have been defined in subnet 1420. Admin partition 1424 is associated with resource domain 1410, and admin partition 1426 is associated with resource domain 1412.

As shown in FIG. 14, vHCA 1442 and HCAs 1446 and 1456 are members of resource domain 1410. In accordance with an embodiment, because admin partition 1424 is associated with resource domain 1410, when vHCA 1442 and HCAs 1446 and 1456 are added as members of resource domain 1410, they also become members of admin partition 1424, and a relationship is created in admin partition registry 1416 between the P_Key defining admin partition 1424 and the identifiers of HCAs 1446 and 1456, and vHCA 1442. In accordance with an embodiment, this relationship defines HCAs 1446 and 1456, and vHCA 1442 as members of admin partition 1424.

Likewise, vHCA 1472 and HCAs 1476 and 1486 are members of resource domain 1412. In accordance with an embodiment, because admin partition 1426 is associated with resource domain 1410, when vHCA 1472 and HCAs 1466 and 1486 are added as members of resource domain 1412, they also become members of admin partition 1426, and a relationship is created in admin partition registry 1416 between the P_Key defining admin partition 1426 and the identifiers of HCAs 1476 and 1486, and vHCA 1472. In accordance with an embodiment, this relationship defines HCAs 1476 and 1486, and vHCA 1472 as members of admin partition 1426.

As noted above, VM 1440 (including vHCA 1442), node 1444 (including HCA 1446) and node 1454 (including HCA 1456) are members of resource domain 1410, in accordance with an embodiment. In an embodiment of the invention, fabric-level administrator 1404 is responsible for adding node 1444 and node 1454 to resource domain 1410. For example, fabric-level administrator 1404 can, through the interface of fabric manager 1402, add nodes 1444 and 1454 to resource domain 1410. Once fabric-level administrator 1404 has added nodes 1444 and 1454 to resource domain 1410, domain admin 1406 can perform administrative tasks on nodes 1444 and 1454. In keeping with the hierarchical scheme of resource domains, however, domain admin 1406 could not perform administrative tasks on nodes 1444 and 1454 before they were added to resource domain 1410 (i.e., while they were a member of the higher-level default domain (not shown). Further, in accordance with an embodiment, domain admin 1408 cannot perform administrative tasks on nodes 1444 and 1454, because nodes 1444 and 1454 are members of a parallel-level resource domain that domain admin 1408 is not associated with.

With continued reference to FIG. 14, and in accordance with an embodiment, admin partitions 1424 and 1426 have been defined within subnet 1420. In keeping with the hierarchical scheme of resource domains, in one embodiment admin partitions 1424 and 1426 were defined by fabric-level administrator 1404. In another embodiment, domain admin 1406 defined admin partition 1424, and domain admin 1408 defined admin partition 1426. In accordance with an embodiment, admin partition 1424 is associated with resource domain 1410, and admin partition 1426 is associated with resource domain 1412. As discussed above, admin partitions 1424 and 1426 represent resource domains 1410 and 1412, respectively, at the subnet level, in accordance with an embodiment. In addition to being associated with their respective resource domains, admin partitions 1424 and 1426 are associated with domain admins 1406 and 1408, respectively (i.e., the corresponding admin user of the resource domains each of the admin partitions is associated with). As noted above, this association between admin partitions and domain-level admins can ensure user-role separation in multi-tenant environments at the subnet level, in accordance with an embodiment.

Data partitions 1428 and 1430 have been defined in subnet 1420, in accordance with an embodiment. In keeping with the hierarchical scheme of resource domains, in one embodiment data partitions 1428 and 1430 were defined by fabric-level administrator 1404. In another embodiment, domain admin 1406 defined data partition 1428, and domain admin 1408 defined data partition 1430. As shown in FIG. 14, data partition 1428 is associated with admin partition 1424, and data partition 1430 is associated with admin partition 1426. Moreover, as noted above and shown in FIG. 14, HCAs 1446 and 1456 and vHCA 1442 are members of admin partition 1424. Consequently, in accordance with an embodiment, HCAs 1446 and 1456 and vHCA 1442 have access permissions to data partition 1428 because they are members of an admin partition (i.e., admin partition 1424) that data partition 1428 is associated with.

In accordance with an embodiment, when data partition 1428 is associated with admin partition 1424, a relationship between the identifier of data partition 1428 (e.g., the P_Key of data partition 1428) and the P_Key of admin partition 1424 is created in the admin partition registry 1416. This relationship defines data partition 1428 as associated with admin partition 1424. Likewise, when data partition 1430 is associated with admin partition 1426 a relationship between the identifier of data partition 1430 (e.g., the P_Key of data partition 1430) and the P_Key of admin partition 1426 is created in the admin partition registry 1416. This relationship defines data partition 1430 as associated with admin partition 1426.

In accordance with an embodiment, if a request were received from either of HCAs 1446 and 1456 or vHCA 1442 to join data partition 1428, SM 1422 could check with admin partition registry 1416, and find that HCAs 1446 and 1456 and vHCA 1442 are members of admin partition 1424, and that data partition 1428 is associated with admin partition 1424. Then, SM 1422 could allow HCAs 1446 and 1456 and vHCA 1442 to become members of data partition 1428 based on HCAs 1446 and 1456 and vHCA 1442 being members of admin partition 1424 and data partition 1428 being associated with admin partition 1424. No manual mapping from either fabric-level administrator 1404 or domain-level administrator 1406 would be necessary to allow HCAs 1446 and 1456 and vHCA 1442 to join data partition 1428.

Moreover, vHCA 1442 can be registered with either of VF 1452 or 1450 of HCA 1446, or either of VF 1462 or 1460 of HCA 1456, because HCAs 1446 and 1456 and vHCA 1442 are members of admin partition 1424 (vHCA 1442 is depicted as registered with VF 1452). Here again, SM 1422 could check with admin partition registry 1416, and find that HCAs 1446 and 1456 and vHCA 1442 are members of admin partition 1424. Upon finding that HCAs 1446 and 1456 and vHCA 1442 are members of admin partition 1424, SM 1422 could allow registration of vHCA 1442 with any of VFs 1452, 1450 1462, and 1460 without intervention from any fabric user.

Figure 15:
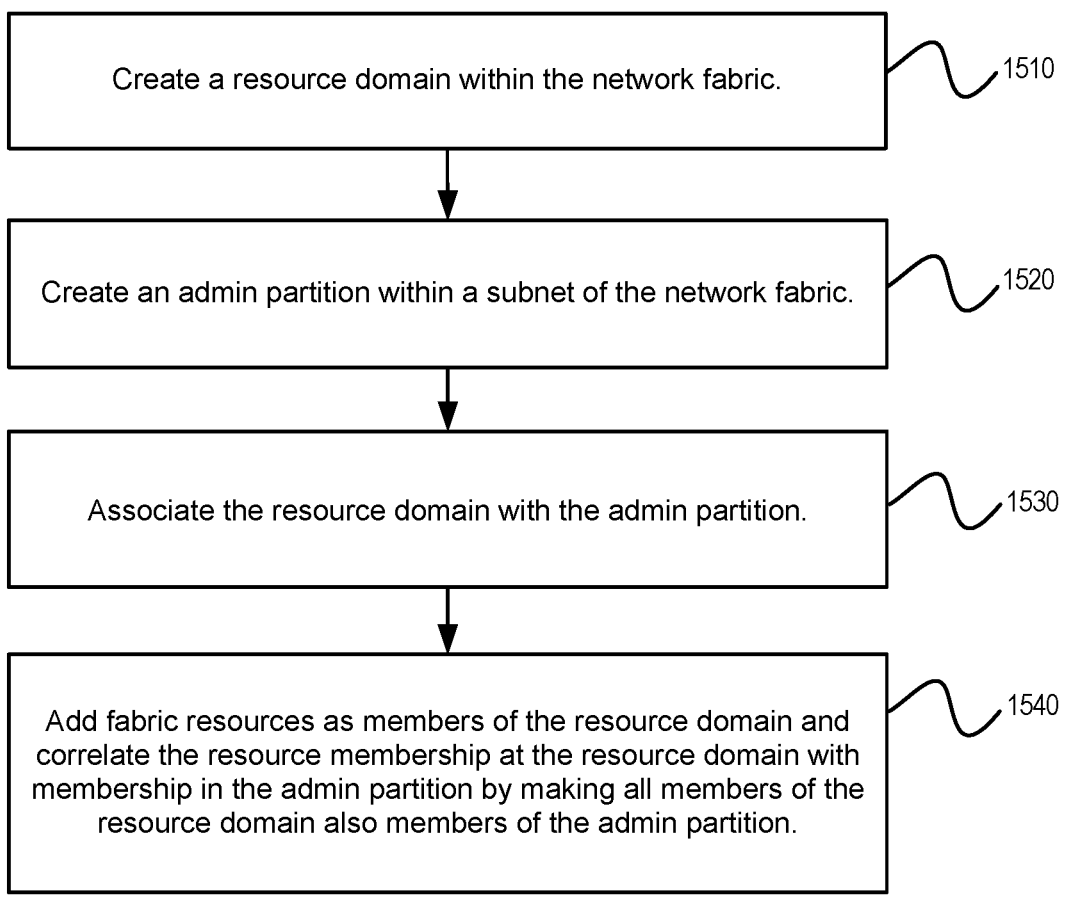
FIG. 15 is a flowchart for correlating resource domain membership with an admin partition membership, in accordance with an embodiment.

FIG. 15 is a flowchart for correlating resource domain membership with an admin partition membership, in accordance with an embodiment.

At step 1510, a resource domain is created within the network fabric.

At step 1520, an admin partition is created within a subnet of the network fabric.

At step 1530, the resource domain is associated with the admin partition.

At step 1540, fabric resources are added to the resource domain as members of the resource domain, and the fabric manager correlates the resource membership at the resource domain with membership in the admin partition by making all members of the resource domain also members of the admin partition.

Figure 16:
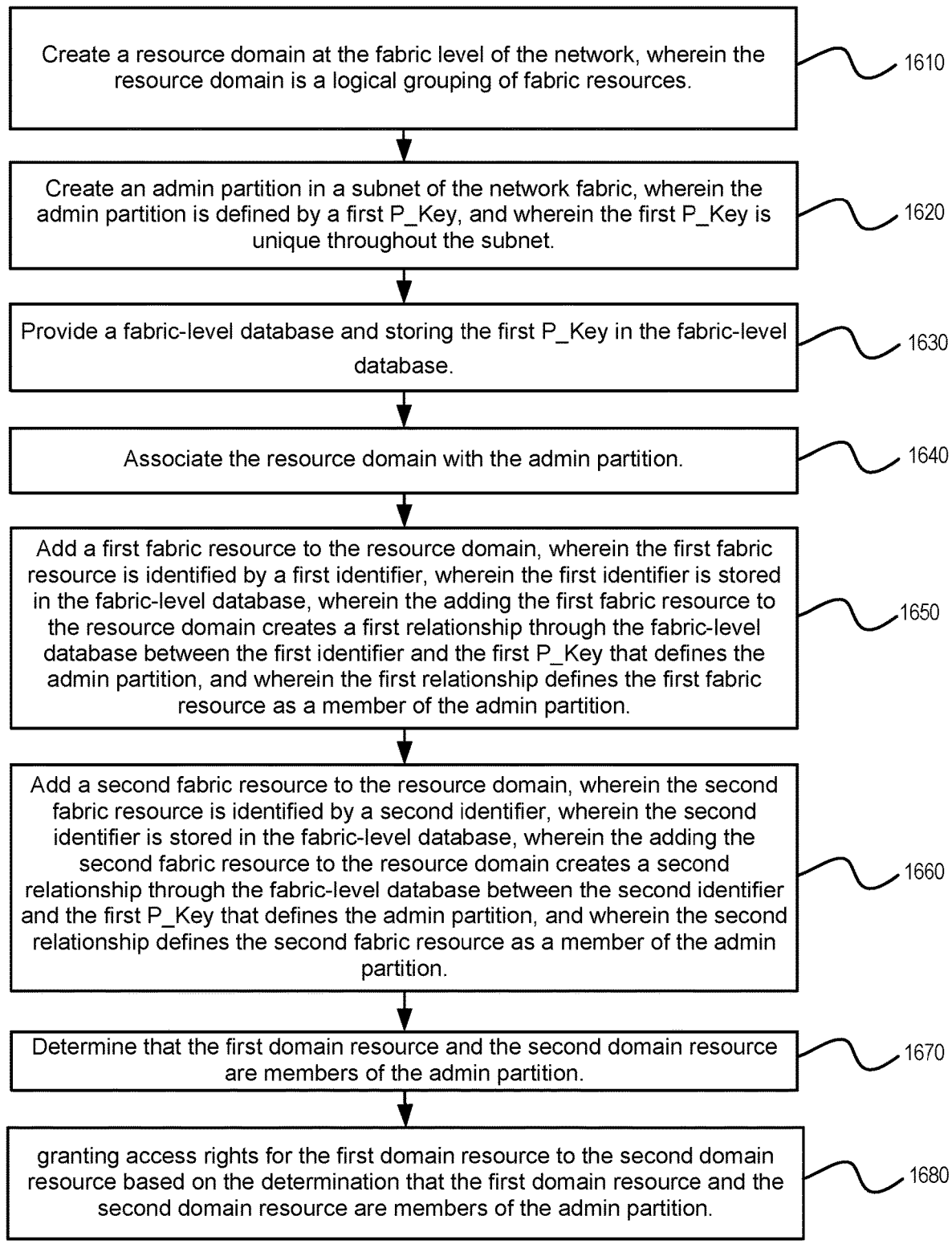
FIG. 16 is a detailed flowchart for a method of correlating resource group membership with admin partition membership using a fabric-level database.

FIG. 16 is a detailed flowchart for a method of correlating resource group membership with admin partition membership using a fabric-level database.

At step 1610, a resource domain is created at the fabric level of the network, where the resource domain is a logical grouping of fabric resources.

At step 1620, an admin partition is created in a subnet of the network, wherein the admin partition is defined by a first P_Key, and wherein the first P_Key is unique throughout the subnet.

At step 1630, a fabric-level database is provided and the first P_Key is stored in the fabric-level database.

At step 1640, the resource domain is associated with the admin partition.

At step 1650, a first fabric resource is added to the resource domain, wherein the first fabric resource is identified by a first identifier, wherein the first identifier is stored in the fabric-level database, wherein the adding the first fabric resource to the resource domain creates a first relationship through the fabric-level database between the first identifier and the P_Key that defines the admin partition, and wherein the first relationship defines the first fabric resource as a member of the admin partition.

At step 1660, a second fabric resource is added to the resource domain, wherein the second fabric resource is identified by a second identifier, wherein the second identifier is stored in the fabric-level database, wherein the adding the second fabric resource to the resource domain creates a second relationship through the fabric-level database between the second identifier and the P_Key that defines the admin partition, and wherein the second relationship defines the second fabric resource as a member of the admin partition.

At step 1670, a determination is made that the first domain resource and the second domain resource are members of the admin partition.

At step 1680, access rights are granted that the first domain resource and the second domain resource are members of the admin partition.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method of correlating fabric-level group membership with subnet-level group membership within a network fabric, comprising:
   providing a computer including one or more microprocessors;
   providing, within the network fabric, a fabric manager associated with a fabric manager database;
   creating a resource domain within the network fabric, wherein the resource domain is a logical grouping of fabric resources;
   assigning a first partition key (P_Key) of a plurality of P_Keys to an admin partition in a subnet of the network fabric;
   assigning a second P_Key to a first data partition within the resource domain;
   assigning a third P_Key to a second data partition within the resource domain; and
   storing, within fabric manager database, a relationship between the admin partition and the first and second data partitions;
   wherein, based upon said relationship, a member of the admin partition has access rights to the first and second data partitions.

2. The method of claim 1, wherein the storing the relationship between the admin partition and the first and second data partitions comprises:
   associating the first P_Key with the second P_Key within the fabric manager database; and associating the first P_Key with the third P_Key within the fabric manager database.

3. The method of claim 2, further comprising:
adding a first fabric resource to the first data partition, wherein the adding comprises assigning the second P_Key to the first fabric resource;
wherein the first fabric resource comprises a first identifier.

4. The method of claim 3, further comprising:
adding a second fabric resource to the second data partition, wherein the adding comprises assigning the third P_Key to the second fabric resource;
wherein the second fabric resource comprises a second identifier.

5. The method of claim 4, further comprising:
receiving, at a graphical user interface of the fabric manager, an instruction to make the first fabric resource a member of the admin partition; and
creating, within the fabric manager database, an association between the first identifier and the first P_Key.

6. The method of claim 5,
wherein, based on said association between the first identifier and the first P_Key, the first fabric resource has access rights within the second data partition.

7. The method of claim 5,
wherein, based on said association between the first identifier and the first P_Key, the first fabric resource has access rights to the second fabric resource.

8. A system of correlating fabric-level group membership with subnet-level group membership within a network fabric, comprising:
a computer including one or more microprocessors;
a fabric manager within the network fabric; and
a fabric manager database associated with the fabric manager;
wherein a resource domain is created within the network fabric, wherein the resource domain is a logical grouping of fabric resources;
wherein a first partition key (P_Key) of a plurality of P_Keys is assigned to an admin partition in a subnet of the network fabric;
wherein a second P_Key is assigned to a first data partition within the resource domain;
wherein a third P_Key is assigned to a second data partition within the resource domain;
wherein a relationship between the admin partition and the first and second data partitions is stored within fabric manager database; and
wherein, based upon said relationship, a member of the admin partition has access rights to the first and second data partitions.

9. The system of claim 8, wherein storing the relationship between the admin partition and the first and second data partitions comprises:
associating the first P_Key with the second P_Key within the fabric manager database; and
associating the first P_Key with the third P_Key within the fabric manager database.

10. The system of claim 9,
wherein a first fabric resource is added to the first data partition, wherein the adding comprises assigning the second P_Key to the first fabric resource;
wherein the first fabric resource comprises a first identifier.

11. The system of claim 10,
wherein a second fabric resource is added to the second data partition, wherein the adding comprises assigning the third P_Key to the second fabric resource;
wherein the second fabric resource comprises a second identifier.

12. The system of claim 11,
wherein an instruction to make the first fabric resource a member of the admin partition is received at a graphical user interface of the fabric manager; and
wherein an association between the first identifier and the first P_Key is created within the fabric manager database.

13. The system of claim 12,
wherein, based on said association between the first identifier and the first P_Key, the first fabric resource has access rights within the second data partition.

14. The system of claim 12,
wherein, based on said association between the first identifier and the first P_Key, the first fabric resource has access rights to the second fabric resource.

15. A non-transitory computer readable storage medium having instructions thereon for correlating fabric-level group membership with subnet-level group membership within a network fabric, which when read and executed cause a computer to perform steps comprising:
providing a computer including one or more microprocessors;
providing, within the network fabric, a fabric manager associated with a fabric manager database;
creating a resource domain within the network fabric, wherein the resource domain is a logical grouping of fabric resources;
assigning a first partition key (P_Key) of a plurality of P_Keys to an admin partition in a subnet of the network fabric;
assigning a second P_Key to a first data partition within the resource domain;
assigning a third P_Key to a second data partition within the resource domain; and
storing, within fabric manager database, a relationship between the admin partition and the first and second data partitions;
wherein, based upon said relationship, a member of the admin partition has access rights to the first and second data partitions.

16. The non-transitory computer readable storage medium of claim 15, wherein the storing the relationship between the admin partition and the first and second data partitions comprises:
associating the first P_Key with the second P_Key within the fabric manager database; and
associating the first P_Key with the third P_Key within the fabric manager database.

17. The non-transitory computer readable storage medium of claim 16, the steps further comprising:
adding a first fabric resource to the first data partition, wherein the adding comprises assigning the second P_Key to the first fabric resource;
wherein the first fabric resource comprises a first identifier.

18. The non-transitory computer readable storage medium of claim 17, the steps further comprising
adding a second fabric resource to the second data partition, wherein the adding comprises assigning the third P_Key to the second fabric resource;

wherein the second fabric resource comprises a second identifier.

19. The non-transitory computer readable storage medium of claim 18, the steps further comprising:
   receiving, at a graphical user interface of the fabric manager, an instruction to make the first fabric resource a member of the admin partition; and
   creating, within the fabric manager database, an association between the first identifier and the first P_Key.

20. The non-transitory computer readable storage medium of claim 19,
   wherein, based on said association between the first identifier and the first P_Key, the first fabric resource has access rights within the second data partition.

* * * * *